(12) United States Patent
Zhu et al.

(10) Patent No.: US 12,738,999 B2
(45) Date of Patent: Sep. 15, 2026

(54) COMMUNICATION METHOD AND APPARATUS

(71) Applicant: HUAWEI TECHNOLOGIES CO., LTD., Shenzhen (CN)

(72) Inventors: Qian Zhu, Shenzhen (CN); Xiaoyan Bi, Ottawa (CA); Rui Ni, Shenzhen (CN); Yi Lv, Shenzhen (CN)

(73) Assignee: Huawei Technologies Co., LTD., Shenzhen (CN)

( * ) Notice: Subject to any disclaimer, the term of this patent is extended or adjusted under 35 U.S.C. 154(b) by 328 days.

(21) Appl. No.: 18/539,528

(22) Filed: Dec. 14, 2023

(65) Prior Publication Data

US 2024/0120977 A1 Apr. 11, 2024

Related U.S. Application Data

(63) Continuation of application No. PCT/CN2022/100551, filed on Jun. 22, 2022.

(30) Foreign Application Priority Data

Jun. 29, 2021 (CN) ........................ 202110727467.6

(51) Int. Cl.

| | |
|---|---|
| ***H04B 7/06*** | (2006.01) |
| ***H04L 1/1607*** | (2023.01) |
| ***H04L 5/00*** | (2006.01) |

(52) U.S. Cl.

CPC ........... *H04B 7/0617* (2013.01); *H04B 7/063* (2013.01); *H04L 1/1614* (2013.01); *H04L 5/0051* (2013.01)

(58) Field of Classification Search

CPC ................ H04L 1/1614; H04L 5/0051; H04B 7/0617; H04B 7/063; H04W 24/02

See application file for complete search history.

(56) References Cited

U.S. PATENT DOCUMENTS

2020/0053757 A1* 2/2020 Bagheri ................ H04L 5/0053
2022/0329293 A1* 10/2022 Tian ...................... H04L 5/1438
2023/0096819 A1* 3/2023 Ni ........................ H04B 7/0639 343/702
2023/0163822 A1* 5/2023 Huang ................. H04B 7/0695 375/295
2023/0171056 A1* 6/2023 Huang .................. H04W 24/02 370/328

(Continued)

OTHER PUBLICATIONS

3GPP TS 38.211 V15.6.0, "3rd Generation Partnership Project, Technical Specification Group Radio Access Network, NR,Physical channels and modulation (Release 15)," Jun. 2019, 97 pages.

(Continued)

*Primary Examiner* — Congvan Tran
(74) *Attorney, Agent, or Firm* — Fish & Richardson P.C.

(57) ABSTRACT

This application relates to communication methods and apparatuses. In an example method, a first communication apparatus generates first indication information, and sends the first indication information to a second communication apparatus. The first indication information indicates M orbital angular momentum (OAM) modes jointly supported by the first communication apparatus and the second communication apparatus, where there is a correspondence between N OAM modes in the M OAM modes and a demodulation reference signal (DMRS) port.

20 Claims, 15 Drawing Sheets

First communication apparatus

Second communication apparatus

300: Generate first indication information (which indicates M OAM modes jointly supported by the first communication apparatus and the second communication apparatus, where there is a correspondence between N OAM modes in the M OAM modes and a DMRS port)

301: Send the first indication information

302: Receive the first indication information

(56) References Cited

U.S. PATENT DOCUMENTS

2023/0363048 A1* 11/2023 Park .................. H04W 28/0268
2024/0080067 A1* 3/2024 Jiang .................. H04B 7/15557

OTHER PUBLICATIONS

3GPP TS 38.212 V15.6.0, "3rd Generation Partnership Project, Technical Specification Group Radio Access Network, NR, Multiplexing and channel coding (Release 15)," Jun. 2019, 101 pages.
3GPP TS 38.214 V15.6.0, "3rd Generation Partnership Project, Technical Specification Group Radio Access Network, NR, Physical layer procedures for data (Release 15)," Jun. 2019, 105 pages.

* cited by examiner

COMMUNICATION METHOD AND APPARATUS

CROSS-REFERENCE TO RELATED APPLICATIONS

This application is a continuation of International Application No. PCT/CN2022/100551, filed on Jun. 22, 2022, which claims priority to Chinese Patent Application No. 202110727467.6, filed on Jun. 29, 2021. The disclosures of the aforementioned applications are hereby incorporated by reference in their entireties.

TECHNICAL FIELD

This application relates to the field of communication technologies, and in particular, to a communication method and apparatus.

BACKGROUND

Currently, conventional resource multiplexing modes include code division multiplexing (code division multiplexing, CDM), frequency division multiplexing (frequency division multiplexing, FDM), and time division multiplexing (time division multiplexing, TDM). CDM is that reference signals of different antenna ports use an exact same group of resource elements (resource elements, REs), and a transmit end multiplexes different reference signals by using orthogonal codewords. FDM is that reference signals of different antenna ports use different subcarriers within one orthogonal frequency division multiplexing (orthogonal frequency division multiplexing, OFDM) symbol. TDM is that reference signals of different antenna ports are carried on different OFDM symbols in one slot (slot) or on different OFDM symbols in one slot by using orthogonal codewords.

A time-frequency resource occupied by the reference signal increases with an increase of a quantity of antenna ports. However, the time-frequency resource is limited, and utilization of the time-frequency resource directly affects a capacity of a communication system. Therefore, how to improve utilization of the time-frequency resource is an urgent problem to be resolved currently.

SUMMARY

This application provides a communication method and apparatus, to improve time-frequency resource utilization.

According to a first aspect, a communication method is provided, including: A first communication apparatus generates first indication information, and sends the first indication information to a second communication apparatus. The first indication information indicates M OAM modes jointly supported by the first communication apparatus and the second communication apparatus, where there is a correspondence between N OAM modes in the M OAM modes and a DMRS port, M and N are each an integer greater than 0, and M is greater than or equal to N. According to the method provided in the first aspect, the correspondence between the OAM modes and the DMRS port can be established, so that in a subsequent process, orthogonality of the OAM modes and the correspondence can be used to superimpose mapping of a DMRS to a mode domain resource based on mapping of the DMRS to a conventional time-frequency code domain resource element. To be specific, a conventional time-frequency code domain resource corresponding to one DMRS port may correspond to one group of OAM modes after a mode domain resource is introduced, and each group of OAM modes may include one or more OAM modes, to improve resource utilization.

In a possible implementation, the first indication information indicates M mode values, and the M mode values are in a one-to-one correspondence with the M OAM modes. In this possible implementation, the M OAM modes can be indicated by indicating the M mode values.

In a possible implementation, the first indication information is the M mode values; the first indication information is a bitmap, each bit in the bitmap corresponds to a mode value in a preset mode value set, and a value of each bit in the bitmap indicates whether the mode value corresponding to the bit belongs to the M mode values; the first indication information is at least one absolute mode value, a mode value corresponding to the at least one absolute mode value is the M mode values, and a non-zero absolute mode value corresponds to two mode values that are a positive mode value and a negative mode value; the first indication information is a bitmap, each bit in the bitmap corresponds to an absolute mode value in a preset absolute mode value set, a value of each bit in the bitmap indicates whether a mode value corresponding to the absolute mode value corresponding to the bit belongs to the M mode values, and a non-zero absolute mode value corresponds to two OAM modes that are a positive mode value and a negative mode value; the first indication information includes an initial mode value, a mode value interval W1, and a quantity M of mode values, the M mode values are M mode values determined by using W1 as a mode value interval starting from the initial mode value, and W1 is greater than 0; the first indication information includes an initial absolute mode value, an absolute mode value interval W2, and a quantity S1 of absolute mode values, the S1 absolute mode values are S1 absolute mode values determined by using W2 as an absolute mode value interval starting from the initial absolute mode value, the M mode values are mode values corresponding to the S1 absolute mode values, a non-zero absolute mode value corresponds to two mode values that are a positive mode value and a negative mode value, W2 is greater than 0, and S1 is an integer greater than 0; or the first indication information is a first index, the first index is an index in a first table, the first table includes a correspondence between at least one index and at least one mode value set, and mode values in a mode value set corresponding to the first index are the M mode values. In this possible implementation, a plurality of methods for indicating the M mode values are provided, so that implementation flexibility of the method is improved.

In a possible implementation, the method further includes: The first communication apparatus sends second indication information to the second communication apparatus, where the second indication information indicates one or more of the following information: diffusion angles of OAM beams corresponding to the M OAM modes, crosstalk coefficients of the M OAM modes, and signal-to-noise ratios of the M OAM modes. In this possible implementation, the first communication apparatus can further indicate other information of the M OAM modes, so that the communication apparatus can more conveniently select an OAM mode.

In a possible implementation, the method further includes: The first communication apparatus sends third indication information to the second communication apparatus, where the third indication information indicates whether to use the OAM mode to modulate a DMRS and data on the DMRS port. In this possible implementation, a receive end and a transmit end can determine, by using the third indication information, whether to use the OAM mode to modulate the DMRS and the data on the DMRS port.

In a possible implementation, the M OAM modes are OAM modes supported on a first time-frequency resource, the first time-frequency resource is used to transmit a DMRS, the first time-frequency resource corresponds to one DMRS port or a plurality of DMRS ports, and time-frequency resources for sending the DMRS in time-frequency resources corresponding to the plurality of DMRS ports are all the first time-frequency resource; the M OAM modes are OAM modes supported in a first time unit; the M OAM modes are OAM modes supported in a first time-frequency unit; or the M OAM modes are all OAM modes jointly supported by the first communication apparatus and the second communication apparatus. In this possible implementation, different granularities can be used to indicate the OAM modes jointly supported by the first communication apparatus and the second communication apparatus, so that a plurality of methods for indicating the OAM modes jointly supported by the first communication apparatus and the second communication apparatus are provided.

In a possible implementation, the method further includes: The first communication apparatus modulates a DMRS and data on the DMRS port by using an OAM mode that corresponds to a DMRS port obtained after OAM mapping, to obtain a modulated DMRS and modulated data; and sends the modulated DMRS and the modulated data to the second communication apparatus, where the OAM mapping refers to establishing the correspondence between the N OAM modes and the DMRS port. In this possible implementation, the OAM mode corresponding to the DMRS port can be used to modulate the DMRS and the data on the DMRS port, so that a quantity of DMRS ports is extended.

In a possible implementation, the correspondence between the N OAM modes and the DMRS port is determined based on sorted N OAM modes; and the N OAM modes are sorted in a first order from first to last, and the first order is an ascending order of absolute mode values, an ascending order of diffusion angles of corresponding OAM beams, an ascending order of crosstalk coefficients, or a descending order of signal-to-noise ratios. In this possible implementation, the sorted N OAM modes are used to establish the correspondence between the N OAM modes and the DMRS port, and the transmit end can select a top-sorted OAM mode to modulate the DMRS and the data on the DMRS port, so that communication quality is improved.

In a possible implementation, the method further includes: The first communication apparatus sends a channel sounding reference signal to the second communication apparatus; the first communication apparatus receives a channel sounding result from the second communication apparatus; and the first communication apparatus determines, based on the channel sounding result, whether a channel between the first communication apparatus and the second communication apparatus is suitable for transmitting an OAM signal; and if the channel between the first communication apparatus and the second communication apparatus is suitable for transmitting an OAM signal, the first communication apparatus determines to use OAM mode multiplexing during DMRS port mapping. In this possible implementation, whether a current channel is suitable for transmitting the OAM signal can be determined by performing channel sounding.

In a possible implementation, the method further includes: The first communication apparatus sends an OAM reference signal to the second communication apparatus, where the OAM reference signal is used to sound a capability of transmitting the OAM signal on the channel between the first communication apparatus and the second communication apparatus; the first communication apparatus receives an OAM channel sounding result from the second communication apparatus, where the OAM channel sounding result indicates the capability of transmitting the OAM signal on the channel between the first communication apparatus and the second communication apparatus; and the first communication apparatus determines the N OAM modes based on the OAM channel sounding result. In this possible implementation, the N OAM modes suitable for a current channel can be determined by performing OAM channel sounding.

In a possible implementation, the method further includes: The first communication apparatus receives a DMRS and data that are modulated by using the OAM mode and that are sent by the second communication apparatus; and the first communication apparatus demodulates the received data based on the OAM mode.

According to a second aspect, a communication method is provided, including: A second communication apparatus receives first indication information from a first communication apparatus, where the first indication information indicates M OAM modes jointly supported by the first communication apparatus and the second communication apparatus, where there is a correspondence between N OAM modes in the M OAM modes and a DMRS port, M and N are each an integer greater than 0, and M is greater than or equal to N. According to the method provided in the second aspect, the correspondence between the OAM modes and the DMRS port can be established, so that in a subsequent process, orthogonality of the OAM modes and the correspondence can be used to superimpose mapping of a DMRS to a mode domain resource based on mapping of the DMRS to a conventional time-frequency code domain resource element. To be specific, a conventional time-frequency code domain resource corresponding to one DMRS port may correspond to one group of OAM modes after a mode domain resource is introduced, and each group of OAM modes may include one or more OAM modes, to improve resource utilization.

In a possible implementation, the first indication information indicates M mode values, and the M mode values are in a one-to-one correspondence with the M OAM modes. In this possible implementation, the M OAM modes can be indicated by indicating the M mode values.

In a possible implementation, the first indication information is the M mode values; the first indication information is a bitmap, each bit in the bitmap corresponds to a mode value in a preset mode value set, and a value of each bit in the bitmap indicates whether the mode value corresponding to the bit belongs to the M mode values; the first indication information is at least one absolute mode value, a mode value corresponding to the at least one absolute mode value is the M mode values, and a non-zero absolute mode value corresponds to two mode values that are a positive mode value and a negative mode value; the first indication information is a bitmap, each bit in the bitmap corresponds to an absolute mode value in a preset absolute mode value set, a value of each bit in the bitmap indicates whether a mode value corresponding to the absolute mode value corresponding to the bit belongs to the M mode values, and a non-zero absolute mode value corresponds to two OAM modes that are a positive mode value and a negative mode value; the first indication information includes an initial mode value, a mode value interval W1, and a quantity M of mode values, the M mode values are M mode values determined by using W1 as a mode value interval starting from the initial mode value, and W1 is greater than 0; the first indication information includes an initial absolute mode value, an absolute mode value interval W2, and a quantity S1 of absolute mode values, the S1 absolute mode values are S1 absolute mode values determined by using W2 as an absolute mode value interval starting from the initial absolute mode value, the M mode values are mode values corresponding to the S1 absolute mode values, a non-zero absolute mode value corresponds to two mode values that are a positive mode value and a negative mode value, W2 is greater than 0, and S1 is an integer greater than 0; or the first indication information is a first index, the first index is an index in a first table, the first table includes a correspondence between at least one index and at least one mode value set, and mode values in a mode value set corresponding to the first index are the M mode values. In this possible implementation, a plurality of methods for indicating the M mode values are provided, so that implementation flexibility of the method is improved.

In a possible implementation, the method further includes: The second communication apparatus receives second indication information from the first communication apparatus, where the second indication information indicates one or more of the following information: diffusion angles of OAM beams corresponding to the M OAM modes, crosstalk coefficients of the M OAM modes, and signal-to-noise ratios of the M OAM modes. In this possible implementation, the first communication apparatus can further indicate other information of the M modes, so that the communication apparatus can more conveniently select an OAM mode.

In a possible implementation, the method further includes: The second communication apparatus receives third indication information from the first communication apparatus, where the third indication information indicates whether to use the OAM mode to modulate the DMRS and the data on the DMRS port. In this possible implementation, a receive end and a transmit end can determine, by using the third indication information, whether to use the OAM mode to modulate the DMRS and the data on the DMRS port.

In a possible implementation, the M OAM modes are OAM modes supported on a first time-frequency resource, the first time-frequency resource is used to transmit a DMRS, the first time-frequency resource corresponds to one DMRS port or a plurality of DMRS ports, and time-frequency resources for sending the DMRS in time-frequency resources corresponding to the plurality of DMRS ports are all the first time-frequency resource; the M OAM modes are OAM modes supported in a first time unit; the M OAM modes are OAM modes supported in a first time-frequency unit; or the M OAM modes are all OAM modes jointly supported by the first communication apparatus and the second communication apparatus. In this possible implementation, different granularities can be used to indicate the OAM modes jointly supported by the first communication apparatus and the second communication apparatus, so that a plurality of methods for indicating the OAM modes jointly supported by the first communication apparatus and the second communication apparatus are provided.

In a possible implementation, the method further includes: The second communication apparatus modulates, by using an OAM mode that corresponds to the DMRS port obtained after OAM mapping, the DMRS and the data on the DMRS port, to obtain a modulated DMRS and modulated data; and sends the modulated DMRS and the modulated data to the first communication apparatus, where the OAM mapping refers to establishing the correspondence between the N OAM modes and the DMRS port. In this possible implementation, the OAM mode corresponding to the DMRS port can be used to modulate the DMRS and the data on the DMRS port, so that a quantity of DMRS ports is extended.

In a possible implementation, the correspondence between the N OAM modes and the DMRS port is determined based on sorted N OAM modes; and the N OAM modes are sorted in a first order from first to last, and the first order is an ascending order of absolute mode values, an ascending order of diffusion angles of corresponding OAM beams, an ascending order of crosstalk coefficients, or a descending order of signal-to-noise ratios. In this possible implementation, the sorted N OAM modes are used to establish the correspondence between the N OAM modes and the DMRS port, and the transmit end can select a top-sorted OAM mode to modulate the DMRS and the data on the DMRS port, so that communication quality is improved.

In a possible implementation, the method further includes: The second communication apparatus sends a channel sounding reference signal to the first communication apparatus; the second communication apparatus receives a channel sounding result from the first communication apparatus; and the second communication apparatus determines, based on the channel sounding result, whether a channel between the second communication apparatus and the first communication apparatus is suitable for transmitting an OAM signal; and if the channel between the second communication apparatus and the first communication apparatus is suitable for transmitting an OAM signal, the second communication apparatus determines to use OAM mode multiplexing during DMRS port mapping. In this possible implementation, whether a current channel is suitable for transmitting the OAM signal can be determined by performing channel sounding.

In a possible implementation, the method further includes: The second communication apparatus sends an OAM reference signal to the first communication apparatus, where the OAM reference signal is used to sound a capability of transmitting the OAM signal on the channel between the second communication apparatus and the first communication apparatus; the second communication apparatus receives an OAM channel sounding result from the first communication apparatus, where the OAM channel sounding result indicates the capability of transmitting the OAM signal on the channel between the second communication apparatus and the first communication apparatus; and the second communication apparatus determines the N OAM modes based on the OAM channel sounding result. In this possible implementation, the N OAM modes suitable for a current channel can be determined by performing OAM channel sounding.

In a possible implementation, the method further includes: The second communication apparatus receives a DMRS that is modulated by using the OAM mode and that is sent by the first communication apparatus; and the second communication apparatus demodulates received data based on the OAM mode.

According to a third aspect, a communication apparatus is provided, including a communication unit and a processing unit, where the processing unit is configured to generate first indication information, where the first indication information indicates M OAM modes jointly supported by the apparatus and a second communication apparatus, where there is a correspondence between N OAM modes in the M OAM modes and a DMRS port, M and N are each an integer greater than 0, and M is greater than or equal to N; and the communication unit is configured to send the first indication information to the second communication apparatus.

In a possible implementation, the first indication information indicates M mode values, and the M mode values are in a one-to-one correspondence with the M OAM modes.

In a possible implementation, the first indication information is the M mode values; the first indication information is a bitmap, each bit in the bitmap corresponds to a mode value in a preset mode value set, and a value of each bit in the bitmap indicates whether the mode value corresponding to the bit belongs to the M mode values; the first indication information is at least one absolute mode value, a mode value corresponding to the at least one absolute mode value is the M mode values, and a non-zero absolute mode value corresponds to two mode values that are a positive mode value and a negative mode value; the first indication information is a bitmap, each bit in the bitmap corresponds to an absolute mode value in a preset absolute mode value set, a value of each bit in the bitmap indicates whether a mode value corresponding to the absolute mode value corresponding to the bit belongs to the M mode values, and a non-zero absolute mode value corresponds to two OAM modes that are a positive mode value and a negative mode value; the first indication information includes an initial mode value, a mode value interval W1, and a quantity M of mode values, the M mode values are M mode values determined by using W1 as a mode value interval starting from the initial mode value, and W1 is greater than 0; the first indication information includes an initial absolute mode value, an absolute mode value interval W2, and a quantity S1 of absolute mode values, the S1 absolute mode values are S1 absolute mode values determined by using W2 as an absolute mode value interval starting from the initial absolute mode value, the M mode values are mode values corresponding to the S1 absolute mode values, a non-zero absolute mode value corresponds to two mode values that are a positive mode value and a negative mode value, W2 is greater than 0, and S1 is an integer greater than 0; or the first indication information is a first index, the first index is an index in a first table, the first table includes a correspondence between at least one index and at least one mode value set, and mode values in a mode value set corresponding to the first index are the M mode values.

In a possible implementation, the communication unit is further configured to send second indication information to the second communication apparatus, where the second indication information indicates one or more of the following information: diffusion angles of OAM beams corresponding to the M OAM modes, crosstalk coefficients of the M OAM modes, and signal-to-noise ratios of the M OAM modes.

In a possible implementation, the communication unit is further configured to send third indication information to the second communication apparatus, where the third indication information indicates whether to use the OAM mode to modulate a DMRS and data on the DMRS port.

In a possible implementation, the M OAM modes are OAM modes supported on a first time-frequency resource, the first time-frequency resource is used to transmit the DMRS, the first time-frequency resource corresponds to one DMRS port or a plurality of DMRS ports, and time-frequency resources for sending the DMRS in time-frequency resources corresponding to the plurality of DMRS ports are all the first time-frequency resource; the M OAM modes are OAM modes supported in a first time unit; the M OAM modes are OAM modes supported in a first time-frequency unit; or the M OAM modes are all OAM modes jointly supported by the apparatus and the second communication apparatus.

In a possible implementation, the processing unit is further configured to modulate, by using an OAM mode that corresponds to a DMRS port obtained after OAM mapping, a DMRS and data on the DMRS port, to obtain a modulated DMRS and modulated data, where the OAM mapping refers to establishing the correspondence between the N OAM modes and the DMRS port; and the communication unit is further configured to send the modulated DMRS and the modulated data to the second communication apparatus.

In a possible implementation, the correspondence between the N OAM modes and the DMRS port is determined based on sorted N OAM modes; and the N OAM modes are sorted in a first order from first to last, and the first order is an ascending order of absolute mode values, an ascending order of diffusion angles of corresponding OAM beams, an ascending order of crosstalk coefficients, or a descending order of signal-to-noise ratios.

In a possible implementation, the communication unit is further configured to send a channel sounding reference signal to the second communication apparatus; the communication unit is further configured to receive a channel sounding result from the second communication apparatus; and the processing unit is further configured to determine, based on the channel sounding result, whether a channel between the apparatus and the second communication apparatus is suitable for transmitting an OAM signal; and if the channel between the apparatus and the second communication apparatus is suitable for transmitting an OAM signal, the processing unit is further configured to determine to use OAM mode multiplexing during DMRS port mapping.

In a possible implementation, the communication unit is further configured to send an OAM reference signal to the second communication apparatus, where the OAM reference signal is used to sound a capability of transmitting the OAM signal on the channel between the apparatus and the second communication apparatus; the communication unit is further configured to receive an OAM channel sounding result from the second communication apparatus, where the OAM channel sounding result indicates the capability of transmitting the OAM signal on the channel between the apparatus and the second communication apparatus; and the processing unit is further configured to determine the N OAM modes based on the OAM channel sounding result.

In a possible implementation, the communication unit is further configured to receive a DMRS and data that are modulated by using the OAM mode and that are sent by the second communication apparatus; and the processing unit is further configured to demodulate the received data based on the OAM mode.

According to a fourth aspect, a communication apparatus is provided, including a processing unit and a communication unit, where the processing unit is configured to receive first indication information from a first communication apparatus by using the communication unit, where the first indication information indicates M OAM modes jointly supported by the first communication apparatus and the apparatus, where there is a correspondence between N OAM modes in the M OAM modes and a DMRS port, M and N are each an integer greater than 0, and M is greater than or equal to N.

In a possible implementation, the first indication information indicates M mode values, and the M mode values are in a one-to-one correspondence with the M OAM modes.

In a possible implementation, the first indication information is the M mode values; the first indication information is a bitmap, each bit in the bitmap corresponds to a mode value in a preset mode value set, and a value of each bit in the bitmap indicates whether the mode value corresponding to the bit belongs to the M mode values; the first indication information is at least one absolute mode value, a mode value corresponding to the at least one absolute mode value is the M mode values, and a non-zero absolute mode value corresponds to two mode values that are a positive mode value and a negative mode value; the first indication information is a bitmap, each bit in the bitmap corresponds to an absolute mode value in a preset absolute mode value set, a value of each bit in the bitmap indicates whether a mode value corresponding to the absolute mode value corresponding to the bit belongs to the M mode values, and a non-zero absolute mode value corresponds to two OAM modes that are a positive mode value and a negative mode value; the first indication information includes an initial mode value, a mode value interval W1, and a quantity M of mode values, the M mode values are M mode values determined by using W1 as a mode value interval starting from the initial mode value, and W1 is greater than 0; the first indication information includes an initial absolute mode value, an absolute mode value interval W2, and a quantity S1 of absolute mode values, the S1 absolute mode values are S1 absolute mode values determined by using W2 as an absolute mode value interval starting from the initial absolute mode value, the M mode values are mode values corresponding to the S1 absolute mode values, a non-zero absolute mode value corresponds to two mode values that are a positive mode value and a negative mode value, W2 is greater than 0, and S1 is an integer greater than 0; or the first indication information is a first index, the first index is an index in a first table, the first table includes a correspondence between at least one index and at least one mode value set, and mode values in a mode value set corresponding to the first index are the M mode values.

In a possible implementation, the processing unit is further configured to receive second indication information from the first communication apparatus by using the communication unit, where the second indication information indicates one or more of the following information: diffusion angles of OAM beams corresponding to the M OAM modes, crosstalk coefficients of the M OAM modes, and signal-to-noise ratios of the M OAM modes.

In a possible implementation, the processing unit is further configured to receive third indication information from the first communication apparatus by using the communication unit, where the third indication information indicates whether to use the OAM mode to modulate a DMRS and data on the DMRS port.

In a possible implementation, the M OAM modes are OAM modes supported on a first time-frequency resource, the first time-frequency resource is used to transmit the DMRS, the first time-frequency resource corresponds to one DMRS port or a plurality of DMRS ports, and time-frequency resources for sending the DMRS in time-frequency resources corresponding to the plurality of DMRS ports are all the first time-frequency resource; the M OAM modes are OAM modes supported in a first time unit; the M OAM modes are OAM modes supported in a first time-frequency unit; or the M OAM modes are all OAM modes jointly supported by the first communication apparatus and the apparatus.

In a possible implementation, the processing unit is further configured to modulate, by using an OAM mode that corresponds to a DMRS port obtained after OAM mapping, a DMRS and data on the DMRS port, to obtain a modulated DMRS and modulated data, where the OAM mapping refers to establishing the correspondence between the N OAM modes and the DMRS port; and the processing unit is further configured to send the modulated DMRS and the modulated data to the first communication apparatus by using the communication unit.

In a possible implementation, the correspondence between the N OAM modes and the DMRS port is determined based on sorted N OAM modes; and the N OAM modes are sorted in a first order from first to last, and the first order is an ascending order of absolute mode values, an ascending order of diffusion angles of corresponding OAM beams, an ascending order of crosstalk coefficients, or a descending order of signal-to-noise ratios.

In a possible implementation, the processing unit is further configured to send a channel sounding reference signal to the first communication apparatus by using the communication unit; the processing unit is further configured to receive a channel sounding result from the first communication apparatus by using the communication unit; and the processing unit is further configured to determine, based on the channel sounding result, whether a channel between the apparatus and the first communication apparatus is suitable for transmitting an OAM signal; and if the channel between the apparatus and the second communication apparatus is suitable for transmitting an OAM signal, the processing unit is further configured to determine to use OAM mode multiplexing during DMRS port mapping.

In a possible implementation, the processing unit is further configured to send an OAM reference signal to the first communication apparatus by using the communication unit, where the OAM reference signal is used to sound a capability of transmitting the OAM signal on the channel between the apparatus and the first communication apparatus; the processing unit is further configured to receive an OAM channel sounding result from the first communication apparatus by using the communication unit, where the OAM channel sounding result indicates the capability of transmitting the OAM signal on the channel between the apparatus and the first communication apparatus; and the processing unit is further configured to determine the N OAM modes based on the OAM channel sounding result.

In a possible implementation, the processing unit is further configured to receive, by using the communication unit, a DMRS that is modulated by using the OAM mode and that is sent by the first communication apparatus; and the processing unit is further configured to demodulate received data based on the OAM mode.

According to a fifth aspect, a communication apparatus is provided, including a processor. The processor is connected to a memory. The memory is configured to store computer-executable instructions, and the processor executes the computer-executable instructions stored in the memory, to implement any method provided in the first aspect or the second aspect. For example, the memory and the processor may be integrated together, or may be independent components. If the memory and the processor are independent components, the memory may be located inside the communication apparatus, or may be located outside the communication apparatus.

In a possible implementation, the processor includes a logic circuit, and further includes an input interface and/or an output interface. For example, the output interface is configured to perform a sending action in a corresponding method, and the input interface is configured to perform a receiving action in the corresponding method.

In a possible implementation, the communication apparatus further includes a communication interface and a communication bus. The processor, the memory, and the communication interface are connected through the communication bus. The communication interface is configured to perform receiving and sending actions in the corresponding method. The communication interface may also be referred to as a transceiver. Optionally, the communication interface includes at least one of a transmitter and a receiver. In this case, the transmitter is configured to perform the sending action in the corresponding method, and the receiver is configured to perform the receiving action in the corresponding method.

In a possible implementation, the communication apparatus exists in a product form of a chip.

According to a sixth aspect, a communication apparatus (or a chip) is provided, including a processor and an interface. The processor is coupled to a memory by using the interface. When the processor executes computer-executable instructions in the memory, any method provided in the first aspect or the second aspect is enabled to be performed.

According to a seventh aspect, a communication apparatus is provided, including a processor and a transceiver. The processor is connected to the transceiver, and the processor performs, by using the transceiver, any method provided in the first aspect or the second aspect.

According to an eighth aspect, a communication apparatus is provided. The apparatus is configured to perform any method provided in the first aspect or the second aspect.

According to a ninth aspect, a communication system is provided, including the foregoing first communication apparatus and second communication apparatus.

According to a tenth aspect, a computer-readable storage medium is provided, including computer-executable instructions. When the computer-executable instructions run on a computer, any method provided in the first aspect or the second aspect is enabled to be performed.

According to an eleventh aspect, a computer program product including computer-executable instructions is provided. When the computer-executable instructions run on a computer, any method provided in the first aspect or the second aspect is enabled to be performed.

According to a twelfth aspect, a computer program is provided. When the computer program runs on a computer, any method provided in the first aspect or the second aspect is enabled to be performed.

For a technical effect brought by any implementation of the third aspect to the twelfth aspect, refer to the technical effect brought by a corresponding implementation of the first aspect or the second aspect. Details are not described herein again.

It should be noted that the solutions in the foregoing aspects may be combined on the premise that the solutions are not contradictory.

DESCRIPTION OF EMBODIMENTS

In descriptions of this application, unless otherwise specified, "/" means "or". For example, A/B may indicate A or B. A term "and/or" in this specification describes only an association relationship between associated objects and indicates that there may be three relationships. For example, A and/or B may represent the following three cases: Only A exists, both A and B exist, and only B exists. In addition, "at least one" means one or more, and "a plurality of" means two or more. Terms such as "first" and "second" do not limit a quantity and an execution sequence, and the terms such as "first" and "second" do not indicate a definite difference.

It should be noted that, in this application, terms such as "example" or "for example" are used to represent an example, an instance, or an illustration. Any embodiment or design scheme described as "example" or "for example" in this application should not be construed as being more preferred or advantageous than other embodiments or design schemes. Exactly, use of the word "example", "for example", or the like is intended to present a related concept in a specific manner.

The technical solutions in embodiments of this application may be applied to various communication systems, for example, a narrowband internet of things (narrowband internet of things, NB-IoT) system, a long term evolution (long term evolution, LTE) system, a 5th-generation (5th-generation, 5G) system, a new radio (new radio, NR) system, a wireless local area network (wireless local area network, WLAN) system, a satellite communication and future evolution system, or a plurality of communication convergence systems. The 5G system may be a non-standalone (non-standalone, NSA) 5G system or a standalone (standalone, SA) 5G system.

Figure 1:
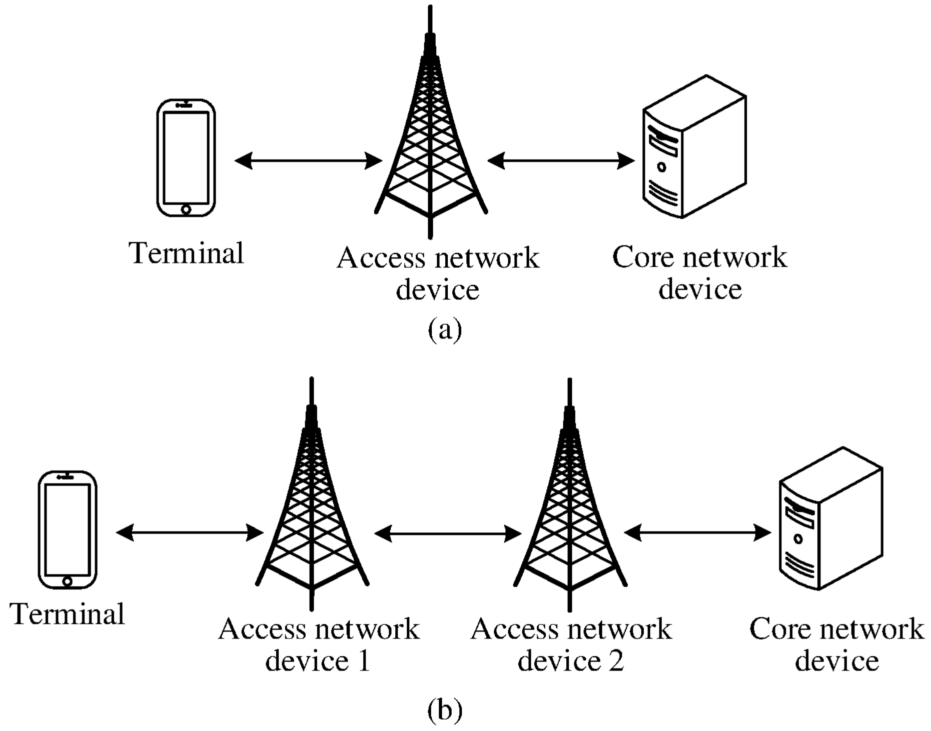
FIG. 1 is a schematic diagram of a network architecture.

In this application, refer to (a) in FIG. 1. A terminal may communicate with a core network device by using one access network device. Refer to (b) in FIG. 1. A terminal may also communicate with a core network device by using a plurality of access network devices. In (b) in FIG. 1, two access network devices are used as an example. During actual implementation, there may be more access network devices. A link between the access network devices and a link between the access network device and the core network device may be referred to as backhaul links. The method provided in embodiments of this application may be applied between the terminal and the access network device (for example, between the terminal and an access network device 1), may be applied between the access network devices (for example, between the access network device 1 and an access network device 2), or may be applied between the access network device and the core network device (for example, between the access network device 2 and the core network device). A single access network device may transmit data and/or signaling with a single terminal, or may transmit data and/or signaling with a plurality of terminals. The method provided in this application may be applied to a radio frequency wireless communication scenario, or may be applied to an optical wireless communication scenario (that is, a scenario in which information is loaded on an optical signal for transmission).

The core network device may be a series of devices that are responsible for managing and distributing access network data, for example, an access and mobility management (access and mobility management function, AMF) function, a user plane (user plane function, UPF) function, and the like.

The access network device is a network-side entity that is configured to send a signal, receive a signal, or send a signal and receive a signal. The access network device may be an apparatus that is deployed in a radio access network (radio access network, RAN) and that provides a wireless communication function for the terminal, for example, may be a base station. The access network device may be a macro base station, a micro base station (also referred to as a small cell), a relay station, an access point (access point, AP), or the like in various forms, or may include a control node in various forms, such as a network controller. The control node may be connected to a plurality of base stations, and configure resources for a plurality of terminals within coverage of the plurality of base stations. In systems that use different radio access technologies, names of devices having functions of the base station may vary. For example, the base station may be referred to as an evolved NodeB (evolved NodeB, eNB, or eNodeB) in an LTE system, and may be referred to as a next generation node base station (next generation node base station, gNB) in an NR system. A specific name of the base station is not limited in this application. Alternatively, the access network device may be a radio controller in a cloud radio access network (cloud radio access network, CRAN) scenario, an access network device in a future evolved public land mobile network (public land mobile network, PLMN), a transmission and reception point (transmission and reception point, TRP), or the like. The access network device includes but is not limited to a network processor, a network memory, a network digital-to-analog conversion apparatus, a network radio frequency link apparatus, and a network antenna array.

The terminal is configured to provide one or more of a voice service and a data connectivity service for a user, and the terminal is a user-side entity that is configured to receive a signal, send a signal, or receive a signal and send a signal. The terminal may also be referred to as user equipment (user equipment, UE), a terminal device, an access terminal, a subscriber unit (subscriber unit), a subscriber station, a mobile station, a remote station, a remote terminal, a mobile terminal, a mobile device, a user terminal, a wireless communication device, a user agent, or a user apparatus. The terminal may be a mobile station (mobile station, MS), a subscriber unit, an unmanned aerial vehicle, an internet of things (internet of things, IoT) device, a station (station, ST) in a wireless local area network (wireless local area network, WLAN), a cellular phone (cellular phone), a smartphone (smartphone), a cordless phone, a wireless data card, a tablet computer, a session initiation protocol (session initiation protocol, SIP) phone, a wireless local loop (wireless local loop, WLL) station, a personal digital assistant (personal digital assistant, PDA) device, a laptop computer (laptop computer), a machine type communication (machine type communication, MTC) terminal, a wireless modem, a handheld device with a wireless communication function, a computing device, another processing device connected to a wireless modem, an in-vehicle device, or a wearable device (which may also be referred to as a wearable intelligent device). Alternatively, the terminal may be a terminal in a next-generation communication system, for example, a terminal in a future evolved PLMN or a terminal in an NR system. The terminal includes but is not limited to a terminal processor, a terminal memory, a terminal digital-to-analog conversion apparatus, a terminal radio frequency link apparatus, and a terminal antenna array.

For ease of understanding of this application, some concepts in this application are first briefly described.

1. Orbital Angular Momentum (Orbital Angular Momentum, OAM)

According to the classical theory of electrodynamics, electromagnetic radiation carries both linear momentum and angular momentum. The angular momentum includes spin angular momentum (spin angular momentum, SAM) and an OAM. The OAM indicates that electrons rotate around a propagation axis, and is generated by rotating an energy flow (described by a Poynting vector) around the propagation axis. The OAM makes a phase wavefront of an electromagnetic wave be in a vortex shape. Therefore, an electromagnetic wave that carries the OAM is also referred to as a vortex electromagnetic wave.

2. OAM Mode

The vortex electromagnetic wave contains a specific topology load, which is referred to as an OAM mode. Each OAM mode has a corresponding mode value. The mode value may be a positive number, may be a negative number, or may be 0. The mode value may be an integer or may not be an integer. OAM modes corresponding to different mode values may be considered as different OAM modes. The OAM mode may be considered as a mode domain resource, and different OAM modes may be considered as different mode domain resources. In this application, to simplify description, an OAM mode whose mode value is A is described as a mode A. For example, an OAM mode whose mode value is 0 is described as a mode 0. To simplify description, the mode value corresponding to the OAM mode is briefly described as a value of the OAM mode, and an absolute value of the mode value corresponding to the OAM mode is described as an absolute mode value.

Among many OAM modes, some OAM modes are orthogonal to each other. The field strength distribution of the vortex electromagnetic wave includes an azimuth factor $e^{-jl\varphi}$, where l is the OAM mode. For example, for a mode 2, an azimuth factor included in the field strength distribution of the vortex electromagnetic wave is $e^{-j2\varphi}$.

3. Beam (Beam)

A main problem of the high-frequency communication is that signal energy sharply decreases as a transmission distance increases, and this results in a short signal transmission distance. To overcome this problem, an analog beam technology is used in the high-frequency communication. A large-scale antenna array is used for weighted processing, so that energy of a signal is concentrated in a small range, to form a signal similar to an optical beam (where the signal is referred to as an analog beam, and is briefly referred to as a beam), to increase a transmission distance.

The beam is a communication resource. The beam may be a wide beam, a narrow beam, or a beam of another type. A beam forming technology may be a beamforming technology or another technical means. The beamforming technology may be specifically a digital beamforming technology, an analog beamforming technology, or a hybrid beamforming technology. Different beams may be considered as different resources. Same information or different information may be sent based on the different beams. Optionally, a plurality of beams having a same communication feature or similar communication features may be considered as one beam.

4. OAM Beam

In this application, the OAM beam is a beam that carries the OAM mode. Due to a special rotational phase of OAM, the OAM beam presents a hollow diffusion characteristic. A diffusion angle of the OAM beam is an included angle between a transmission axis and a location at which a maximum value of strength of the OAM beam is located. The diffusion angle of the OAM beam is related to an aperture of a transmit antenna and an absolute value of the OAM mode. Diffusion angles of OAM beams corresponding to OAM modes with a same absolute value are the same when apertures of transmit antennas are the same. A larger absolute value of the OAM mode indicates a larger diffusion angle of a corresponding OAM beam when apertures of transmit antennas are the same. A larger aperture of the transmit antenna indicates a smaller diffusion angle of a corresponding OAM beam when absolute values of the OAM modes are the same.

A multiple-input multiple-output (Multi-input Multi-output, MIMO) technology is used in a 5G system. In the MIMO technology, a plurality of antennas are separately configured at a transmit end and a receive end. In a conventional MIMO technology (that is, a MIMO technology that does not consider the OAM mode), at a transmit end, multi-stream data is simultaneously mapped to mutually orthogonal channels in a multi-antenna precoding manner, and is sent to a wireless channel by using a plurality of antennas. At a receive end, a plurality of antennas can restore original information after receiving signals. Therefore, compared with a single-input single-output (Single-input Single-output, SISO) system, the conventional MIMO technology can fully utilize spatial resources, implement spatial multiplexing, and further improve spectral efficiency. The conventional MIMO technology needs to implement a plurality of mutually orthogonal channels, resulting in increasing processing complexity of the transmit end and the receive end. A difference between a MIMO technology considering the OAM mode and the conventional MIMO technology lies in that beams that carry orthogonal OAM modes are also orthogonal, and may form a group of orthogonal bases. Each of the orthogonal bases may be used as an orthogonal channel in the MIMO technology. After receiving OAM beams of different OAM modes, the receive end can demodulate information carried in the different OAM modes by performing only an integral operation, without performing complex channel equalization. Therefore, signal processing complexity of the receive end can be reduced.

Figure 2A:
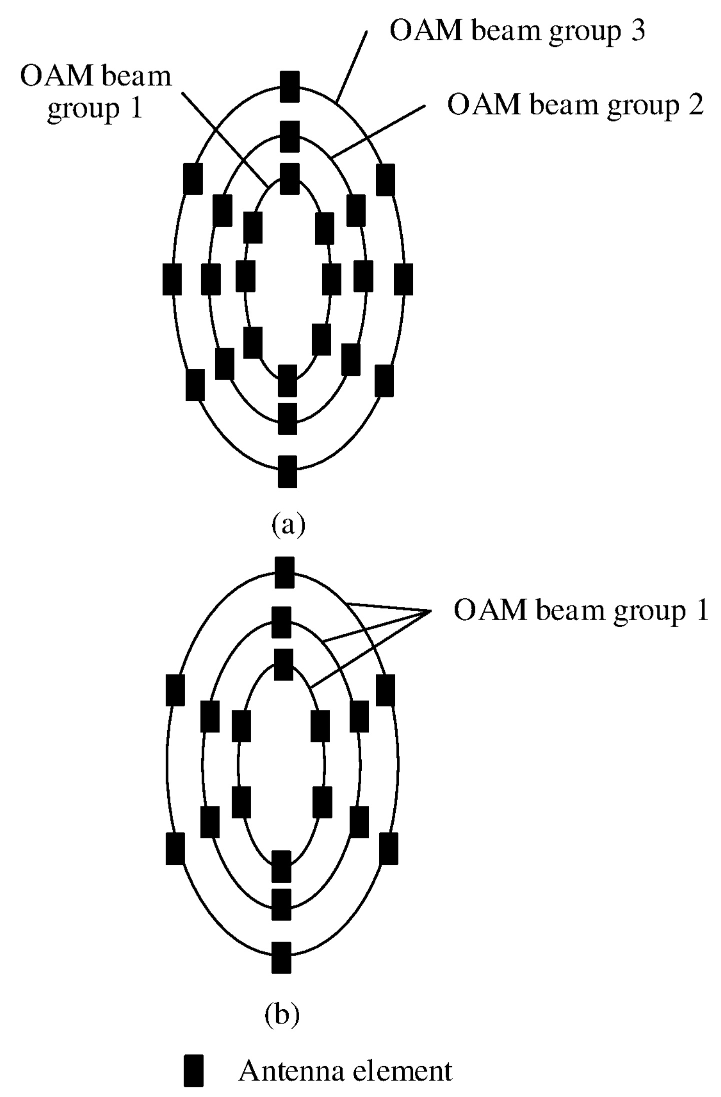
FIG. 2A is a schematic diagram of a uniform circular array (UCA) sending an OAM beam.

Currently, when a channel environment of OAM beam transmission is known in advance, an OAM mode may be determined based on the known channel environment. In this case, an OAM transmission system applied to a wireless communication system is as follows. At a transmit end, an OAM beam may be generated by performing phase weighting on a uniform circular array (uniform circular array, UCA). At a receive end, corresponding data or a corresponding DMRS may be demodulated through corresponding reverse phase weighting. For example, as shown (a) in FIG. 2A and (b) FIG. 2A, a transmit end and a receive end each have three circles of UCAs, and each circle of UCA includes a plurality of antenna elements. For a first OAM beam transmission manner, refer to (a) in FIG. 2A. One group of OAM beams is sent by each circle of UCA, and each group of OAM beams may include one or more beams that carry an OAM mode. In this case, three circles of UCAs may be used to transmit three groups of OAM beams, and values of OAM modes carried in each group of OAM beams may be the same or may be different. For a second OAM beam transmission manner, refer to (b) in FIG. 2A. Three circles of UCAs jointly send one group of OAM modes.

When an OAM beam is sent, it is assumed that Q (where Q is an integer greater than 0) antenna elements are used. For example, in (a) in FIG. 2A, if a quantity of antenna elements for sending each OAM beam in an OAM beam group 1 is 8, different phases may be added to the Q antenna elements, and an azimuth of a $q^{th}$ (where q is an integer greater than 0 and less than or equal to Q) antenna element in the Q antenna elements may be denoted as $\varphi_q$. In this case, a phase corresponding to the $q^{th}$ antenna element is $l\varphi_q$, where l is a value of a generated OAM mode.

5. Reference Signal (Reference Signal, RS)

The reference signal may also be referred to as a pilot (pilot) signal, a reference sequence, or the like. In embodiments of this application, the reference signal may be a reference signal used for channel measurement, for example, a signal state information reference signal (channel state information reference signal, CSI-RS) used for downlink channel measurement or a sounding reference signal (sounding reference signal, SRS) used for uplink channel measurement, or may be a reference signal used for data demodulation, for example, a demodulation reference signal (demodulation reference signal, DMRS).

After precoding a DMRS and data, a transmit end sends the DMRS and the data to a receive end. Same precoding is used for the DMRS and the data. In this way, the precoding is invisible to the receive end. The precoding used for the DMRS may be determined based on channel state information (channel state information, CSI) obtained by the CSI-RS or the SRS.

In addition to the foregoing reference signal, this application further relates to a new reference signal, namely, an OAM reference signal (OAM-RS). The OAM-RS is a reference signal obtained after modulation is performed by using an OAM mode.

It should be understood that the foregoing listed reference signals are merely examples, and should not constitute any limitation on this application. This application does not exclude a possibility of defining another reference signal in a future protocol to implement a same or similar function.

6. Antenna Port (Antenna Port)

The antenna port is a logical concept. One antenna port may correspond to one physical transmit antenna, or may correspond to a plurality of physical transmit antennas. In both the cases, a receiver (receiver) of a terminal does not decompose a signal from a same antenna port. From the perspective of the terminal, regardless of whether a channel is formed by a single physical transmit antenna or is formed by combining a plurality of physical transmit antennas, a reference signal (Reference Signal) corresponding to the antenna port defines the antenna port. For example, an antenna port corresponding to a DMRS is a DMRS port, an antenna port corresponding to a CSI-RS is a CSI-RS port, an antenna port corresponding to an SRS is an SRS port, and an antenna port corresponding to an OAM-RS is an OAM-RS port. The terminal may obtain channel estimation of the antenna port based on the reference signal. Each antenna port corresponds to one time-frequency resource grid (time/frequency resource grid), and has its own reference signal. The time-frequency resource corresponding to the DMRS port includes two parts: One part is used to send the DMRS, and the other part is used to send information (for example, data) other than the DMRS. One antenna port may correspond to one channel, and the terminal may perform channel estimation and data demodulation based on a reference signal corresponding to the antenna port.

7. Data Transmission Mode in a Conventional Technology

Figure 2B:
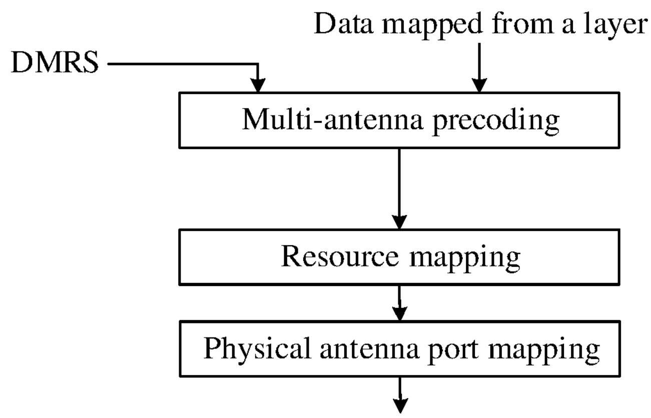
FIG. 2B is a schematic diagram of data transmission.

Downlink transmission is used as an example. Refer to FIG. 2B. After multi-antenna precoding is performed on a DMRS and on data mapped from a layer, the DMRS and the data are mapped to different time-frequency resources through resource mapping, and finally are sent to a channel through physical antenna port mapping. The DMRS is used for channel estimation, and same precoding is used for the DMRS and the data. In this way, the precoding is invisible to a receive end because the receive end considers the precoding as a part of an entire channel. The multi-antenna precoding matrix may be determined based on a channel state. The channel state may be obtained by measuring a CSI-RS from a CSI-RS port. Alternatively, the multi-antenna precoding matrix may be preset or selected from a precoding matrix set. This is not limited in this application.

The foregoing briefly describes some concepts in this application.

Figure 3:
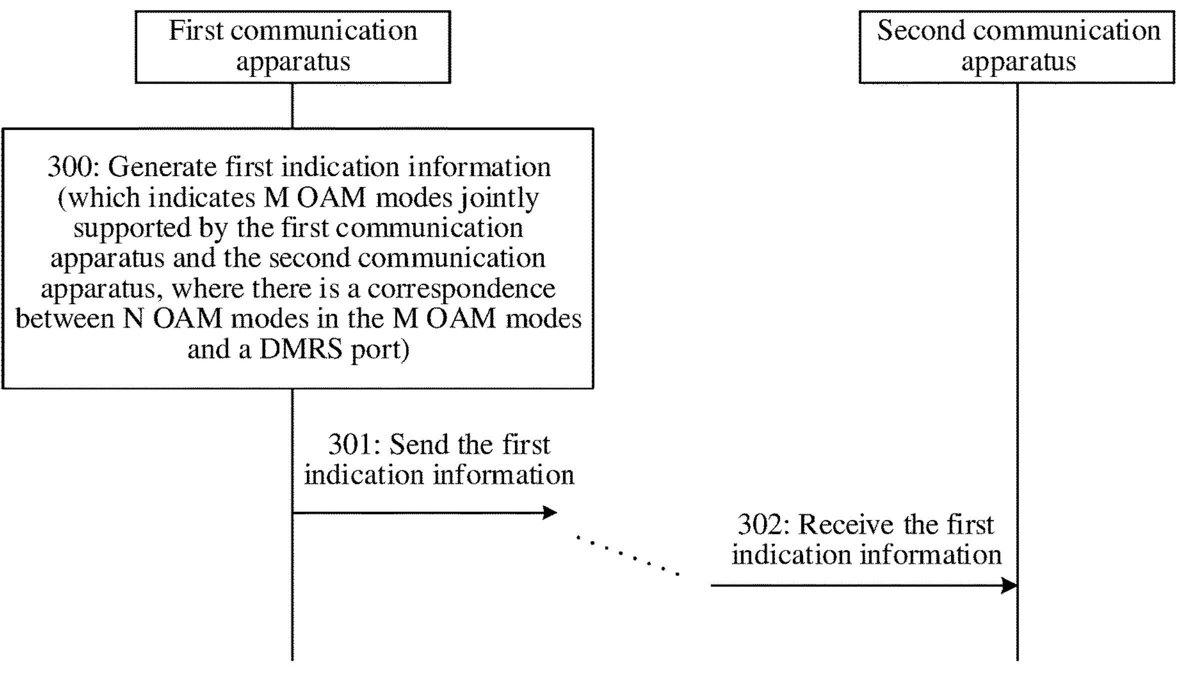
FIG. 3 is a schematic diagram of interaction in a communication method according to this application.

To improve time-frequency resource utilization, this application provides a communication method. An OAM mode is mapped to a DMRS port, to extend a quantity of DMRS ports, so that more mutually orthogonal DMRSs can be transmitted on a same time-frequency resource, or fewer time-frequency resources are occupied when a same quantity of mutually orthogonal DMRSs are transmitted. Refer to FIG. 3. The method provided in this application includes the following steps.

301: A first communication apparatus sends first indication information to a second communication apparatus, where the first indication information indicates M OAM modes jointly supported by the first communication apparatus and the second communication apparatus, where there is a correspondence between N OAM modes in the M OAM modes and a DMRS port, M and N are each an integer greater than 0, and M is greater than or equal to N.

Optionally, before step 301, the method further includes: 300: The first communication apparatus generates the first indication information.

In a first case, the first communication apparatus is an access network device, and the second communication apparatus is a terminal; or the first communication apparatus is a terminal, and the second communication apparatus is an access network device. If the first communication apparatus is an access network device, and the second communication apparatus is a terminal, the terminal may report an OAM mode (which may be actively reported, or may be reported when the access network device indicates the terminal to report a supported OAM mode) supported by the terminal to the access network device. The access network device determines, based on the OAM mode supported by the terminal and an OAM mode supported by the access network device, an OAM mode jointly supported by the access network device and the terminal, and the access network device indicates the OAM mode jointly supported by the access network device to the terminal. If the first communication apparatus is a terminal, and the second communication apparatus is an access network device, the access network device indicates an OAM mode supported by the access network device to the terminal. The terminal determines, based on the OAM mode supported by the access network device and an OAM mode supported by the terminal, an OAM mode jointly supported by the access network device and the terminal, and reports the jointly supported OAM mode (which may be actively reported, or may be reported when the access network device indicates the terminal to report the jointly supported OAM mode) to the access network device.

In a second case, the first communication apparatus is an access network device, and the second communication apparatus is another access network device; the first communication apparatus is an access network device, and the second communication apparatus is a core network device; or the first communication apparatus is a core network device, and the second communication apparatus is an access network device. In this case, the second communication apparatus may send a supported OAM mode (which may be actively sent, or may be sent when the first communication apparatus requests to send the supported OAM mode) to the first communication apparatus. The first communication apparatus determines, based on the OAM mode supported by the second communication apparatus and an OAM mode supported by the first communication apparatus, an OAM mode jointly supported by the first communication apparatus and the second communication apparatus, and indicates the jointly supported OAM mode to the second communication apparatus.

Optionally, the first indication information indicates M mode values, and the M mode values are in a one-to-one correspondence with the M OAM mode values. In other words, the first indication information specifically indicates a mode value set, the mode value set includes the M mode values, and the M mode values are in a one-to-one correspondence with the M OAM modes jointly supported by the first communication apparatus and the second communication apparatus.

The M OAM modes in this application may be OAM modes on one or more bandwidth parts (bandwidth parts, BWP) used for communication between the first communication apparatus and the second communication apparatus, and any two of the M OAM modes are mutually orthogonal. OAM modes on different BWPs may be the same or may be different. This is not limited in this application.

That there is a correspondence between N OAM modes and a DMRS port may be that there is a correspondence between the N OAM modes and a DMRS port of a specific second communication apparatus, or may be that there is a correspondence between the N OAM modes and DMRS ports of a plurality of second communication apparatuses. DMRS ports of different second communication apparatuses may be completely different, partially the same, or all the same.

In the correspondence between the N OAM modes and the DMRS port, a plurality of DMRS ports that have a same time-frequency resource and that are used to send DMRSs correspond to a same OAM mode set, and OAM modes in the OAM mode set belong to the N OAM modes. OAM modes in an OAM mode set corresponding to DMRS ports that have different time-frequency resources and that are used to send DMRSs may be all the same or partially the same, or may be completely different. This is not limited in this application.

Figure 5:
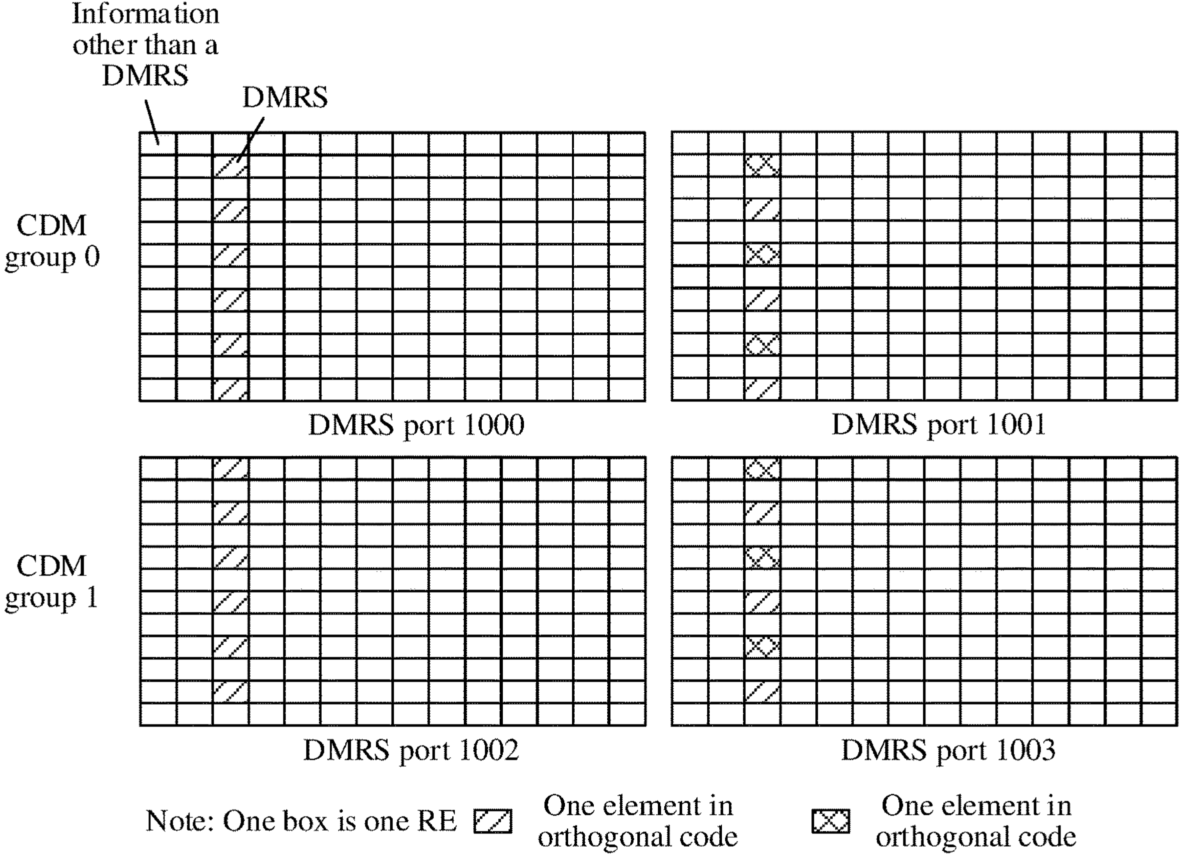
FIG. 5 is a schematic diagram of DMRS ports according to this application.

For example, refer to FIG. 5 in the following. Resources used to send DMRSs in a DMRS port 1000 and a DMRS port 1001 (that is, resources in shadow parts of the DMRS port 1000 and the DMRS port 1001 in FIG. 5, which are assumed as a first time-frequency resource) are the same, and resources used to send DMRSs in a DMRS port 1002 and a DMRS port 1003 (that is, resources in shadow parts of the DMRS port 1002 and the DMRS port 1003 in FIG. 5, which are denoted as a second time-frequency resource) are the same. It should be noted that mode values of OAM modes supported on one time-frequency resource (or DMRS ports that all send DMRSs on the time-frequency resource) may form a mode value set. For example, for a mode value set corresponding to the first time-frequency resource, DMRS ports that send DMRSs on the first time-frequency resource, the second time-frequency resource, and DMRS ports that send DMRSs on the second time-frequency resource, refer to Table 1.

TABLE 1

| DMRS port | Time-frequency resource | Mode value set |
|---|---|---|
| DMRS port 1000 and DMRS port 1001 | First time-frequency resource | {−4, −2, 0, 2, 4} |
| DMRS port 1002 and DMRS port 1003 | Second time-frequency resource | {−3, −1, 0, 2, 3} |

It should be noted that when a correspondence between OAM modes and a DMRS port is established (which may also be considered as OAM mapping), a quantity of DMRS ports is extended. There are several OAM modes in a mode value set corresponding to one DMRS port, and the DMRS port may be extended to several DMRS ports. For example, in the example shown in Table 1, if there are five OAM modes in a mode value set corresponding to the DMRS port 1000, the DMRS port 1000 may be extended to five DMRS ports, and another DMRS port is similar. For example, based on the example shown in FIG. 5 below, the DMRS port 1000 may be extended to the DMRS port 1000 and a DMRS port 1004 by using a mode 0 and a mode 2 in {−4, −2, 0, 2, 4}, the DMRS port 1001 may be extended to the DMRS port 1001 and a DMRS port 1005 by using the mode 0 and the mode 2 in {−4, −2, 0, 2, 4}, the DMRS port 1002 may be extended to the DMRS port 1002 and a DMRS port 1006 by using a mode 0 and a mode 2 in {−3, −1, 0, 2, 3}, and the DMRS port 1003 may be extended to the DMRS port 1003 and a DMRS port 1007 by using the mode 0 and the mode 2 in {−3, −1, 0, 2, 3}. For an extended DMRS port, refer to FIG. 8. One of an OAM mode 1 and an OAM mode 2 is the mode 0, and the other is the mode 2.

It should be noted that, if there is a correspondence between an OAM mode set and a DMRS port, it indicates that an OAM mode in the OAM mode set is subsequently used to transmit data and a DMRS on the DMRS port. In other words, if one piece of data is mapped to one DMRS port, in a subsequent process, the piece of data is transmitted by using an OAM mode in an OAM mode set corresponding to the DMRS port.

If the M OAM modes are used as a set (denoted as a set 1), and the N OAM modes are used as another set (denoted as a set 2), the set 2 is a subset of the set 1.

302: The second communication apparatus receives the first indication information from the first communication apparatus.

According to the method provided in this embodiment of this application, the correspondence between the OAM modes and the DMRS port can be established, so that in a subsequent process, orthogonality of the OAM modes and the correspondence can be used to superimpose mapping of a DMRS to a mode domain resource based on mapping of the DMRS to a conventional time-frequency code domain resource element. To be specific, a conventional time-frequency code domain resource corresponding to one DMRS port may correspond to one group of OAM modes after a mode domain resource is introduced, and each group of OAM modes may include one or more OAM modes, to improve resource utilization. In this application, the OAM is introduced into a future wireless communication protocol, so that performance of an existing MIMO system can be improved in a channel environment with a relatively large line of sight component, and calculation complexity can be reduced.

In the foregoing embodiment, optionally, the first indication information may be implemented in any one of the following manner 1 to manner 9.

Manner 1: The first indication information is the M mode values.

For example, it is assumed that a maximum mode value in the M mode values is X1. In this case, each mode value in the M mode values needs to be indicated by $\lceil \log_2(X1) \rceil + 1$ bits (bits), where an additional one bit indicates that the mode value is positive or negative. In this case, for the first indication information, $M^*(\lceil \log_2(X1) \rceil + 1)$ bits are required in total to indicate the M mode values.

In the manner 1, consecutive or non-consecutive mode values may be indicated when no mode value set is preset.

Manner 2: The first indication information is a bitmap (bitmap), each bit in the bitmap corresponds to a mode value in a preset mode value set, and a value of each bit in the bitmap indicates whether the mode value corresponding to the bit belongs to the M mode values.

In the manner 2, one mode value set may be preset at a transmit end and a receive end. For example, if the preset mode value set includes S2 mode values, the bitmap includes S2 bits. The value of each bit in the bitmap indicates whether a corresponding mode value is a mode value of an OAM mode jointly supported by the first communication apparatus and the second communication apparatus (that is, the value of each bit in the bitmap indicates whether the corresponding mode value belongs to the M OAM modes). For example, when the value of each bit in the bitmap is 1, it indicates that the corresponding mode value is the mode value of the OAM mode jointly supported by the first communication apparatus and the second communication apparatus, or vice versa. For example, if the preset mode value set is {−1, 0, 1, 2, 3, 4}, when the value of each bit in the bitmap is 1, it indicates that the corresponding mode value is the mode value of the OAM mode jointly supported by the first communication apparatus and the second communication apparatus. If the bitmap is 001011, the M mode values are {1, 3, 4}.

In the manner 2, non-consecutive mode values may be indicated.

Manner 3: The first indication information is at least one absolute mode value (where it is assumed that the absolute mode value is S3 absolute mode values), mode values corresponding to the S3 absolute mode values are the M mode values, and a non-zero absolute mode value corresponds to two mode values that are a positive mode value and a negative mode value.

In the manner 3, the non-zero absolute mode value corresponds to two mode values that are a positive mode value and a negative mode value. For example, when the absolute mode value is 1, the absolute mode value corresponds to two mode values that are a mode value +1 and a mode value −1. When the absolute mode value is 3, the absolute mode value corresponds to two mode values that are a mode value +3 and a mode value −3. When the absolute mode value is 0, the absolute mode value corresponds one mode value that is a mode value 0.

In the manner 3, if the M mode values include a mode value that is a mode value 0, the S3 absolute mode values include 0. In this case, M=2*(S3−1)+1. If the M mode values do not include a mode value that is a mode value 0, the S3 absolute mode values do not include 0. In this case, M=2*S3. "*" in this application refers to "multiplied by".

When the M mode values include the mode value 0, in an implementation, the mode value 0 is separately indicated. In this case, if a maximum absolute mode value of the M mode values is X2, two mode values with a same absolute mode value may be indicated by using $\lceil \log_2(X2) \rceil$ bits, a non-zero mode value of the M mode values may be indicated by using $$\lceil \log_2(X2) \rceil \times \frac{M-1}{2}$$

bits, and whether a jointly supported mode value includes the mode value 0 is indicated by another bit (which may be referred to as a mode indicator 0). In this case, the first indication information may include $$\lceil \log_2(X2) \rceil \times \frac{M-1}{2} + 1$$

bits. Optionally, the first indication information further includes one bit (which may be referred to as an absolute mode value indicator) used to indicate whether the $$\lceil \log_2(X2) \rceil \times \frac{M-1}{2}$$

bits indicate a mode value or an absolute mode value. In this case, the first indication information may include $$\lceil \log_2(X2) \rceil \times \frac{M-1}{2} + 2$$

bits.

When the M mode values include the mode value 0, in another implementation, the mode value 0 is not separately indicated. If a maximum absolute mode value of the M mode values is X2, each absolute mode value may be indicated by using $\lceil \log_2(X2+1) \rceil$ bits, and the M mode values may be indicated by using $$\lceil \log_2(X2+1) \rceil \times \frac{M+1}{2} \text{ or } \lceil \log_2(X2+1) \rceil \times \frac{M}{2}$$

bits. Optionally, the first indication information further includes one bit (which may be referred to as an absolute mode value indicator) used to indicate whether the first indication information indicates a mode value or an absolute mode value. In this case, the first indication information may include $$\lceil \log_2(X2+1) \rceil \times \frac{M+1}{2} + 1 \text{ or } \lceil \log_2(X2+1) \rceil \times \frac{M}{2} + 1$$

bits.

When the M mode values do not include the mode value 0, if a maximum absolute mode value of the M mode values is X3, two mode values with a same absolute mode value may be indicated by using $\lceil \log_2(X3) \rceil$ bits, and the M mode values may be indicated by using $$\lceil \log_2(X3) \rceil \times \frac{M}{2}$$

bits. Optionally, the first indication information further includes one bit (which may be referred to as an absolute mode value indicator) used to indicate whether the $$\lceil \log_2(X3) \rceil \times \frac{M}{2}$$

bits indicate a mode value or an absolute mode value. In this case, the first indication information may include $$\lceil \log_2(X3) \rceil \times \frac{M}{2} + 1$$

bits.

In the manner 3, consecutive or non-consecutive absolute mode values may be indicated when no absolute mode value set is preset, and indication overheads can be reduced compared with the manner 1.

Manner 4: The first indication information is a bitmap, each bit in the bitmap corresponds to an absolute mode value in a preset absolute mode value set, a value of each bit in the bitmap indicates whether a mode value corresponding to the absolute mode value corresponding to the bit belongs to M mode values, and a non-zero absolute mode value corresponds to two OAM mode values that are a positive mode value and a negative mode value.

In the manner 4, one absolute mode value set may be preset at a transmit end and a receive end. For example, if the preset absolute mode value set includes S4 absolute mode values, the bitmap includes S4 bits, and the S4 bits may indicate 2*S4 mode values (in this case, 2*S4=M, and the M mode values do not include a mode value 0) or 2*S4−1 mode values (in this case, 2*S4−1=M, and the M mode values include a mode value 0). A value of each bit in the bitmap indicates whether two mode values that are a positive mode value and a negative mode value and that correspond to a corresponding absolute mode value are mode values of OAM modes jointly supported by the first communication apparatus and the second communication apparatus (that is, the value of each bit indicates whether the two mode values that are a positive mode value and a negative mode value and that correspond to the corresponding absolute mode value belong to the M OAM mode values). For example, when the value of each bit in the bitmap is 1, it indicates that the two mode values that are a positive mode value and a negative mode value and that correspond to the corresponding absolute mode value are mode values of the OAM modes jointly supported by the first communication apparatus and the second communication apparatus. It should be noted that if an absolute mode value corresponding to a bit in the bitmap is 0, a value of the bit indicates whether a corresponding mode value 0 is a mode value of an OAM mode jointly supported by the first communication apparatus and the second communication apparatus. For example, if the preset absolute mode value set is {0, 1, 2, 3, 4}, when the value of each bit in the bitmap is 1, it indicates that a mode value corresponding to the corresponding absolute mode value is the mode value of the OAM mode jointly supported by the first communication apparatus and the second communication apparatus. If the bitmap is 01011, the M mode values are respectively +1, −1, +3, −3, +4, and −4.

In the manner 4, consecutive or non-consecutive absolute mode values may be indicated, and further consecutive or non-consecutive mode values may be indicated.

Manner 5: The first indication information includes an initial mode value, a mode value interval W1, and a quantity M of mode values, the M mode values are M mode values determined by using W1 as a mode value interval starting from the initial mode value, and W1 is greater than 0.

For example, if the initial mode value is −5, W1 is 2, and M=6, the M mode values are respectively −5, −3, −1, 1, 3, and 5.

In the manner 5, the first indication information may indicate one or more mode values with a same mode value interval.

Manner 6: The first indication information includes an initial bit location in a bitmap, a bit location interval W3, and a quantity M of mode values, each bit in the bitmap corresponds to one mode value in a preset mode value set, a value of each bit in the bitmap indicates whether the mode value corresponding to the bit belongs to the M mode values, and the M mode values are mode values that correspond to M bits determined by using W3 as a bit location interval starting from the initial bit location.

In the manner 6, for example, if the preset mode value set is {−1, 0, 1, 2, 3, 4}, the bitmap includes six bits, and the six bits respectively correspond to {−1, 0, 1, 2, 3, 4} from first to last. If the initial bit location is a third bit, and the bit location interval is 2, the M bits are the third bit and a fifth bit, and the M mode values are {1, 3}.

Manner 7: The first indication information includes an initial absolute mode value, an absolute mode value interval W2, and a quantity S1 of absolute mode values, the S1 absolute mode values are S1 absolute mode values determined by using W2 as an absolute mode value interval starting from the initial absolute mode value, the M mode values are mode values corresponding to the S1 absolute mode values, a non-zero absolute mode value corresponds to two mode values that are a positive mode value and a negative mode value, W2 is greater than 0, and S1 is an integer greater than 0.

For example, if the initial absolute mode value is 1, W2 is 2, and S1=3, the S1 absolute mode values are 1, 3, and 5, and the M mode values are −1, +1, −3, +3, −5, and +5.

In the manner 7, the first indication information may indicate one or more mode values with a same absolute mode value interval.

Manner 8: The first indication information includes an initial bit location in a bitmap, a bit location interval W4, and a quantity S5 of absolute mode values, each bit in the bitmap corresponds to one absolute mode value in a preset absolute mode value set, a value of each bit in the bitmap indicates whether a mode value corresponding to the absolute mode value corresponding to the bit belongs to the M mode values, the M mode values are mode values corresponding to absolute mode values corresponding to S5 bits determined by using W4 as a bit location interval starting from the initial bit location, a non-zero absolute mode value corresponds to two mode values that are a positive mode value and a negative mode value, and S5 is an integer greater than 0.

In the manner 8, one initial absolute mode value set may be preset at a transmit end and a receive end. For example, if the preset absolute mode value set is {0, 1, 2, 3, 4}, the bitmap includes five bits, and the five bits respectively correspond to {0, 1, 2, 3, 4} from first to last. If the initial bit location is a third bit, and the bit location interval is 2, the S5 bits are the third bit and a fifth bit, and the M mode values are {−4, −2, +2, +4}.

In the manner 5 to the manner 8, W1 and W2 may be integers or may not be integers, and W3 and W4 are integers.

Manner 9: The first indication information is a first index, the first index is an index in a first table, the first table includes a correspondence between at least one index and at least one mode value set, and mode values in a mode value set corresponding to the first index are the M mode values.

In the manner 9, the first table may be preset. For example, Table 2 shows an example of the first table. Based on this example, if the first index is an index 0, the M mode values are {−4, −2, 0, 2, 4}.

TABLE 2

| Index | Mode value set |
|---|---|
| 0 | {−4, −2, 0, 2, 4} |
| 1 | {−3, −1, 0, 1, 3} |

In the manner 9, the first communication apparatus and the second communication apparatus may indicate a mode value of a jointly supported OAM mode only by sending the index in the first table. Therefore, signaling overheads can be greatly reduced.

Optionally, the M OAM modes indicated by the first indication information may have the following four cases.

Case 1: The M OAM modes are OAM modes supported on a first time-frequency resource, the first time-frequency resource is used to transmit a DMRS, the first time-frequency resource corresponds to one DMRS port or a plurality of DMRS ports (assumed to be P DMRS ports), and time-frequency resources for sending the DMRS in time-frequency resources corresponding to the P DMRS ports are all the first time-frequency resource.

In the case 1, the first indication information may indicate OAM modes corresponding to DMRS ports that have a same time-frequency resource used to send the DMRS. To indicate OAM modes supported on another time-frequency resource (or OAM modes corresponding to DMRS ports that have another same time-frequency resource for sending the DMRS), a method for indicating the OAM mode supported on the first time-frequency resource may be used.

Optionally, the first communication apparatus indicates, to the second communication apparatus, OAM modes supported on a plurality of time-frequency resources, and the plurality of time-frequency resources correspond to some or all DMRS ports. OAM modes supported on different time-frequency resources may be partially or completely the same, or may be completely different. This is not limited in this application.

For example, based on the example shown in Table 1, the first communication apparatus may indicate, based on the first indication information, the OAM modes (namely, the M OAM modes) supported on the first time-frequency resource, and indicate, based on another piece of indication information, OAM modes supported on a second time-frequency resource. Case 2: The M OAM modes are OAM modes supported in a first time unit.

For example, the time unit in this application may be a slot. The first time unit may be any one of time units corresponding to a DMRS port between the first communication apparatus and the second communication apparatus. During actual implementation, the first communication apparatus may indicate, to the second communication apparatus, OAM modes supported in some or all of time units corresponding to the DMRS port between the first communication apparatus and the second communication apparatus. OAM modes supported in different time units may be partially or completely the same, or may be completely different. This is not limited in this application. Similar to that in the case 1, OAM mode values of the OAM modes supported in the time units may also form a mode value set.

Case 3: The M OAM modes are OAM modes supported in a first time-frequency unit.

For example, the time-frequency unit in this application may be a physical resource block (physical resource block, PRB). The first time-frequency unit may be any one of time-frequency units corresponding to DMRS ports between the first communication apparatus and the second communication apparatus. During actual implementation, the first communication apparatus may indicate, to the second communication apparatus, OAM modes supported in some or all time-frequency units corresponding to the DMRS port between the first communication apparatus and the second communication apparatus. OAM modes supported in different time-frequency units may be partially or completely the same, or may be completely different. This is not limited in this application. Similar to that in the case 1, OAM mode values of the OAM modes supported in the time-frequency units may also form a mode value set.

Compared with that in the case 1, signaling complexity and overheads are reduced to some extent in the case 2 and the case 3.

Case 4: The M OAM modes are all OAM modes jointly supported by the first communication apparatus and the second communication apparatus.

In the case 4, optionally, all jointly supported OAM modes may be indicated for each second communication apparatus. In this case, OAM modes indicated to different second communication apparatuses may be partially or completely the same, or may be completely different. This is not limited in this application. In the case 4, signaling overheads are relatively small.

In the case 4, optionally, the first communication apparatus indicates, to the second communication apparatus, one or more of the following: OAM modes supported on some or all of time-frequency resources between the first communication apparatus and the second communication apparatus (for a specific indication method, refer to the case 1), OAM modes supported in some or all of time units corresponding to the DMRS port between the first communication apparatus and the second communication apparatus (for a specific indication method, refer to the case 2), and OAM modes supported in some or all time-frequency units corresponding to the DMRS port between the first communication apparatus and the second communication apparatus (for a specific indication method, refer to the case 3). An OAM mode supported on a time-frequency resource for sending a DMRS in a time-frequency resource corresponding to each DMRS port, supported in each time unit, or supported in each time-frequency unit may be some or all of the M OAM modes.

In the case 1 and the case 3 described above, to reduce signaling overheads, the M OAM modes may be indicated through frequency domain compression. For example, it is assumed that $$R = \tilde{R} R_f^H,$$

and R may be indicated by indicating $\tilde{R}$ and $R_f$. $R=[R^{(1)}, R^{(2)}, \ldots R^{(N_u)}]$, which is an OAM mode supported on one time-frequency resource or in a time-frequency unit, and a dimension is $N_{OAM} \times N_u$, where $N_{OAM}$ is a quantity of OAM modes on each subcarrier, and $N_u$ is a quantity of subcarriers in frequency domain; $\tilde{R}$ is a compressed coefficient, a dimension is $N_{OAM} \times N_c$; $R_f$ is a frequency domain base vector;

$$R_f^H$$

is a conjugate transposition matrix of $R_f$, and a dimension is $N_u \times N_c$. Because of frequency domain correlation, and $N_c < N_u$, indication bit overheads may be reduced by indicating $\tilde{R}$ and $R_f$.

The N OAM modes may be first determined before the correspondence between the N OAM modes and the DMRS ports is established (that is, OAM mapping is performed).

Specifically, the first communication apparatus may determine the N OAM modes in any one of the following manner A to manner D.

Manner A:

The manner A specifically includes the following steps.

(11) The first communication apparatus sends an OAM-RS to the second communication apparatus, where the OAM-RS is used to sound a capability of transmitting an OAM signal on a channel between the first communication apparatus and the second communication apparatus. Correspondingly, the second communication apparatus receives the OAM-RS from the first communication apparatus. The OAM-RS is obtained by modulating an RS by using the OAM mode jointly supported by the first communication apparatus and the second communication apparatus.

(12) The second communication apparatus performs OAM channel sounding based on the received OAM-RS to obtain an OAM channel sounding result, and sends the OAM channel sounding result to the first communication apparatus, where the OAM channel sounding result indicates the capability of transmitting the OAM signal on the channel between the first communication apparatus and the second communication apparatus. Correspondingly, the first communication apparatus receives the OAM channel sounding result from the second communication apparatus. The OAM channel sounding result may include one or more of information about whether the OAM signal is suitable for transmission, an OAM mode resource that can be used by the channel, or an OAM channel response (for example, a crosstalk coefficient or a signal-to-noise ratio).

(13) The first communication apparatus determines the N OAM modes based on the OAM channel sounding result.

Manner B:

The manner B specifically includes the following steps.

(21) The second communication apparatus sends an OAM-RS to the first communication apparatus, where the OAM-RS is used to sound a capability of transmitting an OAM signal on a channel between the second communication apparatus and the first communication apparatus. Correspondingly, the first communication apparatus receives the OAM-RS from the second communication apparatus.

(22) The first communication apparatus performs OAM channel sounding based on the received OAM-RS to obtain an OAM channel sounding result.

(23) The first communication apparatus determines the N OAM modes based on the OAM channel sounding result.

Manner C:

The manner C specifically includes the following steps.

(31) The first communication apparatus obtains a statistical feature of a channel between the first communication apparatus and the second communication apparatus. Specifically, the first communication apparatus may obtain the statistical feature of the channel between the first communication apparatus and the second communication apparatus based on a historical channel sounding result.

(32) The first communication apparatus determines the N OAM modes based on the statistical feature of the channel between the first communication apparatus and the second communication apparatus.

Manner D:

The manner D specifically includes the following steps.

(41) The second communication apparatus determines the N OAM modes, and sends fourth indication information to the first communication apparatus, where the fourth indication information indicates the N OAM modes. Correspondingly, the first communication apparatus receives the fourth indication information from the second communication apparatus.

(42) The first communication apparatus determines the N OAM modes based on the fourth indication information.

In the manner D, the second communication apparatus may determine the N OAM modes in the following manner E, manner F, or manner G.

Specifically, the second communication apparatus may determine the N OAM modes in any one of the following manner E to manner H.

Manner E:

The manner E specifically includes the following steps.

(51) The second communication apparatus sends an OAM-RS to the first communication apparatus, where the OAM-RS is used to sound a capability of transmitting an OAM signal on a channel between the second communication apparatus and the first communication apparatus. Correspondingly, the first communication apparatus receives the OAM-RS from the second communication apparatus. The OAM-RS is obtained by modulating an RS by using the OAM mode jointly supported by the second communication apparatus and the first communication apparatus.

(52) The first communication apparatus performs OAM channel sounding based on the received OAM-RS to obtain an OAM channel sounding result, and sends the OAM channel sounding result to the second communication apparatus, where the OAM channel sounding result indicates the capability of transmitting the OAM signal on the channel between the second communication apparatus and the first communication apparatus. Correspondingly, the second communication apparatus receives the OAM channel sounding result from the first communication apparatus.

(53) The second communication apparatus determines the N OAM modes based on the OAM channel sounding result.

For specific implementation of each step in the manner E, refer to the manner A for understanding. Details are not described again.

Manner F:

The manner F specifically includes the following steps.

(61) The first communication apparatus sends an OAM-RS to the second communication apparatus, where the OAM-RS is used to sound a capability of transmitting an OAM signal on a channel between the first communication apparatus and the second communication apparatus. Correspondingly, the second communication apparatus receives the OAM-RS from the first communication apparatus.

(62) The second communication apparatus performs OAM channel sounding based on the received OAM-RS to obtain an OAM channel sounding result.

(63) The second communication apparatus determines the N OAM modes based on the OAM channel sounding result.

For specific implementation of each step in the manner F, refer to the manner B for understanding. Details are not described again.

Manner G:

The manner G specifically includes the following steps.

(71) The second communication apparatus obtains a statistical feature of a channel between the first communication apparatus and the second communication apparatus. The second communication apparatus may obtain the statistical feature of the channel between the first communication apparatus and the second communication apparatus based on a historical channel sounding result.

(72) The second communication apparatus determines the N OAM modes based on the statistical feature of the channel between the first communication apparatus and the second communication apparatus.

Manner H:

The manner H specifically includes the following steps.

(81) The first communication apparatus determines the N OAM modes, and sends fifth indication information to the second communication apparatus, where the fifth indication information indicates the N OAM modes. Correspondingly, the second communication apparatus receives the fifth indication information from the first communication apparatus.

(82) The second communication apparatus determines the N OAM modes based on the fifth indication information.

In the manner H, the first communication apparatus may determine the N OAM modes in the foregoing manner A, manner B, or manner C.

For specific implementation of each step in the manner H, refer to the manner D for understanding. Details are not described again.

In the foregoing manner A to manner H, when sending the OAM-RS, the first communication apparatus and the second communication apparatus may modulate the RS based on the M OAM modes to obtain M OAM-RSs, where each of the OAM-RSs may be used to determine whether an OAM mode corresponding to the OAM-RS belongs to the N OAM modes. For example, when an OAM channel sounding result determined based on one OAM-RS indicates that a current channel is suitable for transmitting the OAM-RS, an OAM mode corresponding to the OAM-RS may belong to the N OAM modes.

The correspondence between the N OAM modes and the DMRS port may be determined by the first communication apparatus and sent to the second communication apparatus, may be determined by the second communication apparatus and sent to the first communication apparatus, or may be separately determined by the first communication apparatus and the second communication apparatus. This is not limited in this application.

Optionally, the correspondence between the N OAM modes and the DMRS port is determined based on sorted N OAM modes; and the N OAM modes are sorted in a first order from first to last, and the first order is an ascending order of absolute mode values, an ascending order of diffusion angles of corresponding OAM beams, an ascending order of crosstalk coefficients, or a descending order of signal-to-noise ratios. In other words, absolute mode values/diffusion angles of OAM beams/crosstalk coefficients/signal-to-noise ratios of OAM modes that correspond to some DMRS ports are relatively large, and absolute mode values/diffusion angles of OAM beams/crosstalk coefficients/signal-to-noise ratios of OAM modes that correspond to some DMRS ports are relatively small.

It should be noted that, when the N OAM modes are sorted, the M OAM modes may be first sorted because the N OAM modes belong to the M OAM modes. In this case, a sorting result of the N OAM modes may also be learned of. Alternatively, the N OAM modes may be directly sorted. An advantage of the former is that, if OAM modes that have a correspondence with a DMRS port change in a subsequent process, the OAM modes do not need to be sorted, and only a sorting result of the OAM modes needs to be determined based on the sorting result of the M OAM modes.

A smaller crosstalk coefficient indicates smaller interference between an OAM mode and other OAM modes, and the crosstalk coefficient may be a sum of inter-mode crosstalk between the OAM mode and the other OAM modes. One or more of a crosstalk coefficient of the OAM mode, a diffusion angle of an OAM beam corresponding to the OAM mode, and a signal-to-noise ratio of the OAM mode may be indicated by the first communication apparatus. In this case, the method further includes: The first communication apparatus sends second indication information to the second communication apparatus, where the second indication information indicates one or more of the following information: diffusion angles of OAM beams corresponding to the M OAM mode, crosstalk coefficients of the M OAM modes, and signal-to-noise ratios of the M OAM modes. Correspondingly, the second communication apparatus receives the second indication information from the first communication apparatus, and determines, based on the second indication information, one or more of the following information: the diffusion angles of the OAM beams corresponding to the M OAM modes, the crosstalk coefficients of the M OAM modes, and the signal-to-noise ratios of the M OAM modes. A crosstalk coefficient of an OAM mode in the first communication apparatus may be obtained by performing channel sounding on the OAM mode. Alternatively, a crosstalk coefficient and a signal-to-noise ratio of an OAM mode in the second communication apparatus may not be indicated by the first communication apparatus, but may be obtained by performing channel sounding on the OAM mode. In this case, the second communication apparatus may send the second indication information to the first communication apparatus, so that the first communication apparatus obtains one or more of the following information: the diffusion angles of the OAM beams corresponding to the M OAM modes, the crosstalk coefficients of the M OAM modes, and the signal-to-noise ratios of the M OAM modes. The signal-to-noise ratio of the OAM mode in this application may be, for example, a receive signal-to-noise ratio.

When the OAM modes are sorted, if the first order is the ascending order of absolute mode values, for a same absolute mode value, a negative mode may be first sorted and is followed by a positive mode, or a positive mode may be first sorted and is followed by a negative mode. If the first order is the ascending order of diffusion angles, for a same diffusion angle, a descending order of absolute mode values may be used, and for a same absolute mode value, a negative mode may be first sorted and is followed by a positive mode, or a positive mode may be first sorted and is followed by a negative mode. For example, Table 3 shows an example of the sorted M OAM modes obtained when the first orders are different.

TABLE 3

| Index | First order | Sorted M OAM modes |
|---|---|---|
| 0 | Ascending order of absolute mode values | {0, −1, 1, 2, −3, . . .} |
| 1 | Ascending order of diffusion angles | {0, −1, 1, 3, −3, . . .} |
| 2 | Ascending order of crosstalk coefficients | {0, −1, 1, −3, 2, 4, . . .} |
| 3 | Descending order of signal-to-noise ratios | {0, −1, 1, −3, 2, 4, . . .} |

In the optional method, because an OAM mode with a smaller absolute mode value and a smaller crosstalk coefficient has a stronger anti-interference capability, a signal-to-noise ratio of an OAM beam with a smaller diffusion angle of the corresponding OAM beam is larger, and quality of a signal carried in an OAM mode with a larger signal-to-noise ratio is higher. Therefore, a correspondence is established between the sorted N OAM mode and the DMRS port, so that when a requirement on communication quality is relatively high, an OAM mode with a stronger anti-interference capability and/or higher corresponding signal quality is selected to modulate a DMRS and data on a corresponding DMRS port, so as to improve an anti-interference capability and/or signal quality of the DMRS and the data.

Optionally, OAM channel sounding is performed after it is determined that OAM mode multiplexing is used during DMRS port mapping. Whether OAM mode multiplexing is used during DMRS port mapping may be determined by the first communication apparatus, where the information is sent to the second communication apparatus, may be determined by the second communication apparatus, where the information is sent to the first communication apparatus, or may be separately determined by the first communication apparatus and the second communication apparatus. This is not limited in this application.

Optionally, the first communication apparatus may determine, in the following manner I or manner J, whether OAM mode multiplexing is used during DMRS port mapping.

Manner I:

The manner I includes the following steps.

(91) The first communication apparatus sends a channel sounding reference signal (for example, an SRS or a CSI-RS) to the second communication apparatus. Correspondingly, the second communication apparatus receives the channel sounding reference signal from the first communication apparatus.

(92) The second communication apparatus performs channel sounding based on the received channel sounding reference signal, and sends a channel sounding result to the first communication apparatus. Correspondingly, the first communication apparatus receives the channel sounding result from the second communication apparatus.

(93) The first communication apparatus determines, based on the channel sounding result, whether a channel between the first communication apparatus and the second communication apparatus is suitable for transmitting an OAM signal. For example, the channel sounding result includes a channel matrix. The channel matrix can indicate a multipath richness degree of a current channel, and a richer multipath indicates that the current channel is more unsuitable for transmitting the OAM signal.

(94) If the channel between the apparatus and the second communication apparatus is suitable for transmitting an OAM signal, the first communication apparatus determines to use OAM mode multiplexing during DMRS port mapping.

Manner J:

The manner J includes the following steps.

(101) The second communication apparatus sends a channel sounding reference signal (for example, an SRS or a CSI-RS) to the first communication apparatus. Correspondingly, the first communication apparatus receives the channel sounding reference signal from the second communication apparatus.

(102) The first communication apparatus determines a channel sounding result based on the received channel sounding reference signal.

(103) The first communication apparatus determines, based on the channel sounding result, whether a channel between the first communication apparatus and the second communication apparatus is suitable for transmitting an OAM signal. For example, the channel sounding result includes a channel matrix. The channel matrix can indicate a multipath richness degree of a current channel, and a richer multipath indicates that the current channel is more unsuitable for transmitting the OAM signal.

(104) If the channel between the first communication apparatus and the second communication apparatus is suitable for transmitting an OAM signal, the first communication apparatus determines to use OAM mode multiplexing during DMRS port mapping.

Optionally, the second communication apparatus may determine, in a manner K or a manner L, whether to use OAM mode multiplexing during DMRS port mapping.

Manner K:

The manner K includes the following steps.

(111) The second communication apparatus sends a channel sounding reference signal (for example, an SRS or a CSI-RS) to the first communication apparatus. Correspondingly, the first communication apparatus receives the channel sounding reference signal from the second communication apparatus.

(112) The first communication apparatus performs channel sounding based on the received channel sounding reference signal, and sends a channel sounding result to the second communication apparatus. Correspondingly, the second communication apparatus receives the channel sounding result from the first communication apparatus.

(113) The second communication apparatus determines, based on the channel sounding result, whether a channel between the second communication apparatus and the first communication apparatus is suitable for transmitting an OAM signal. For example, the channel sounding result includes a channel matrix. The channel matrix can indicate a multipath richness degree of a current channel, and a richer multipath indicates that the current channel is more unsuitable for transmitting the OAM signal.

(114) If the channel between the second communication apparatus and the first communication apparatus is suitable for transmitting an OAM signal, the second communication apparatus determines to use OAM mode multiplexing during DMRS port mapping.

Manner L:

The manner L includes the following steps.

(121) The first communication apparatus sends a channel sounding reference signal (for example, an SRS or a CSI-RS) to the second communication apparatus. Correspondingly, the second communication apparatus receives the channel sounding reference signal from the first communication apparatus.

(122) The second communication apparatus determines a channel sounding result based on the received channel sounding reference signal.

(123) The second communication apparatus determines, based on the channel sounding result, whether a channel between the second communication apparatus and the first communication apparatus is suitable for transmitting an OAM signal. For example, the channel sounding result includes a channel matrix. The channel matrix can indicate a multipath richness degree of a current channel, and a richer multipath indicates that the OAM signal is more unsuitable for transmission.

(124) If the channel between the second communication apparatus and the first communication apparatus is suitable for transmitting an OAM signal, the second communication apparatus determines to use OAM mode multiplexing during DMRS port mapping.

In the foregoing embodiment, if it is determined, based on the channel sounding result, that a channel environment is not suitable for transmitting the OAM signal, it may be determined that OAM mode multiplexing does not need to be used during DMRS port mapping, and OAM-RS channel sounding does not need to be further performed. If it is determined, based on the channel sounding result, that a channel environment is suitable for transmitting the OAM signal, it may be further determined, by using the OAM-RS, whether to use OAM mode multiplexing during DMRS port mapping and a mode domain resource (that is, the N OAM modes) used during OAM mode multiplexing is further determined.

Based on the correspondence between the OAM modes and the DMRS port, the DMRS and the data may be transmitted between the first communication apparatus and the second communication apparatus. The first communication apparatus may send the DMRS and the data to the second communication apparatus (denoted as Solution 1), or the second communication apparatus may send the DMRS and the data to the first communication apparatus (denoted as Solution 2). Only one solution in Solution 1 and Solution 2 may be performed, or both solutions may be performed. This is not limited in this application. The following separately describes implementation processes of Solution 1 and Solution 2.

Solution 1:

Solution 1 may include the following steps.

(131) The first communication apparatus modulates, by using an OAM mode that corresponds to a DMRS port obtained after OAM mapping (that is, by using a DMRS port obtained after OAM mapping extension), a DMRS and data on the DMRS port, to obtain a modulated DMRS and modulated data. For example, after the first communication apparatus determines to perform mode domain multiplexing and perform OAM mapping, based on the example shown in FIG. 8, the first communication apparatus may map data to a DMRS port 1000 and a DMRS port 1004. A DMRS and data on the DMRS port 1000 may be modulated by using a mode 0, and a DMRS and data on the DMRS port 1004 may be modulated by using a mode 2. The DMRS port 1004 is a DMRS port extended by the DMRS port 1000 after OAM mapping.

(132) The first communication apparatus sends the modulated DMRS and the modulated data to the second communication apparatus. Correspondingly, the second communication apparatus receives the DMRS that is modulated by using the OAM mode and that is sent by the first communication apparatus.

(133) The second communication apparatus demodulates received data based on the OAM mode. Specifically, the second communication apparatus may sequentially demodulate the received data by using the N OAM modes.

Solution 2:

Solution 2 may include the following steps.

(141) The second communication apparatus modulates, by using an OAM mode that corresponds to a DMRS port obtained after OAM mapping, a DMRS and data on the DMRS port, to obtain a modulated DMRS and modulated data. For specific implementation of step (141), refer to step (131) for understanding. Details are not described again.

(142) The second communication apparatus sends the modulated DMRS and the modulated data to the first communication apparatus. Correspondingly, the first communication apparatus receives the DMRS and the data that are modulated by using the OAM mode and that are sent by the second communication apparatus. For specific implementation of step (142), refer to step (132) for understanding. Details are not described again.

(143) The first communication apparatus demodulates received data based on the OAM mode. For specific implementation of step (143), refer to step (133) for understanding. Details are not described again.

Optionally, the method further includes: The first communication apparatus sends third indication information to the second communication apparatus, where the third indication information indicates whether to use the OAM mode to modulate the DMRS and the data (or used to indicate whether mode domain multiplexing is enabled). Correspondingly, the second communication apparatus receives the third indication information from the first communication apparatus, and determines, based on the third indication information, whether to use the OAM mode to modulate the DMRS and the data. Alternatively, the third indication information may be sent by the second communication apparatus to the first communication apparatus. In this case, the first communication apparatus determines, based on the third indication information, whether to use the OAM mode to modulate the DMRS and the data. It should be noted that the third indication information merely indicates whether to enable mode domain multiplexing. However, whether a channel is suitable for transmitting an OAM signal actually needs to be determined based on a channel sounding result. In other words, whether to enable mode domain multiplexing actually needs to be determined with reference to other information. When the first communication apparatus and the second communication apparatus determine to enable mode domain multiplexing, Solution 1 and/or Solution 2 above are performed.

For example, the third indication information may be one bit, and the bit indicates whether to use the OAM mode to modulate the DMRS and the data. If a value of the bit is 0, it indicates using the OAM mode to modulate the DMRS and the data. If a value of the bit is 1, it indicates not using the OAM mode to modulate the DMRS and the data, or vice versa.

When one of the first communication apparatus and the second communication apparatus is an access network device, and the other is a terminal, the third indication information may be carried in a scheduling command or DCI of the access network device if the third indication information is sent by the access network device, or the third indication information may be carried in feedback information sent by the terminal to the access network device if the third indication information is sent by the terminal.

It should be noted that a DMRS and data may alternatively be directly sent between the first communication apparatus and the second communication apparatus on a DMRS port on which mode domain multiplexing is configured. In this case, the first communication apparatus and the second communication apparatus may not exchange the third indication information. In this case, different identifiers may be used to distinguish between a DMRS port on which mode domain multiplexing is configured and a DMRS port on which mode domain multiplexing is not configured.

Figure 4:
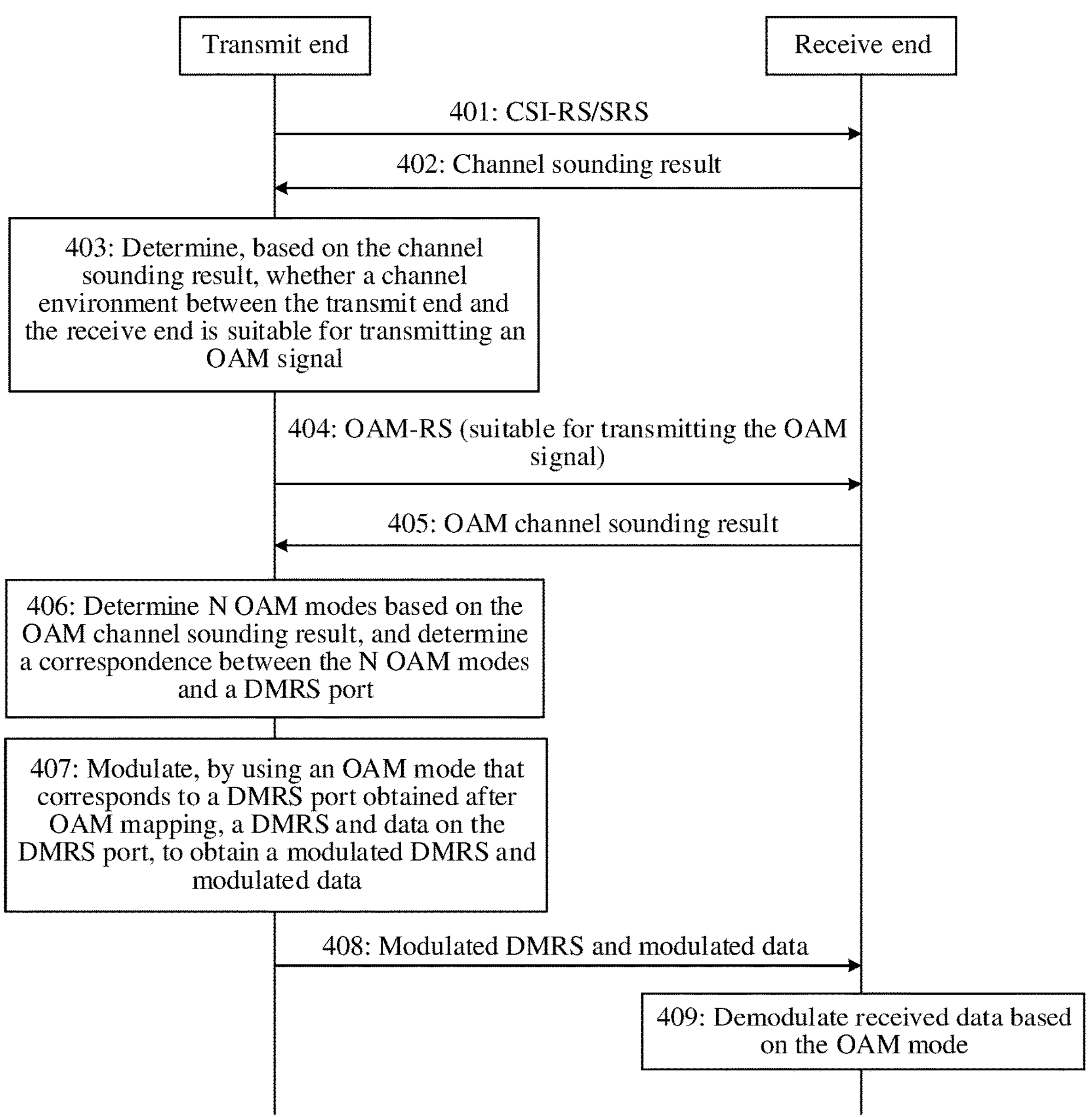
FIG. 4 is a schematic diagram of interaction in another communication method according to this application.

For an example procedure of the method provided in the foregoing embodiment, refer to FIG. 4, and the method includes the following steps.

401: A transmit end sends a CSI-RS/SRS to a receive end. Correspondingly, the receive end receives the CSI-RS/

SRS. The CSI-RS/SRS is used for channel sounding. In this application, the transmit end may be the first communication apparatus, and the receive end may be the second communication apparatus; or the transmit end is the second communication apparatus, and the receive end is the first communication apparatus.

402: The receive end feeds back, to the transmit end, a channel sounding result determined based on the CSI-RS/SRS. Correspondingly, the transmit end receives the channel sounding result.

403: The transmit end determines, based on the channel sounding result, whether a channel environment between the transmit end and the receive end is suitable for transmitting an OAM signal.

404: If the channel environment between the transmit end and the receive end is suitable for transmitting an OAM signal, the transmit end sends an OAM-RS to the receive end. Correspondingly, the receive end receives the OAM-RS. The OAM-RS is used to perform OAM channel sounding.

405: The receive end feeds back, to the transmit end, an OAM channel sounding result determined based on the received OAM-RS. Correspondingly, the transmit end receives the OAM channel sounding result.

It should be noted that the CSI-RS/SRS directly sent through the antenna port, and the OAM-RS carries an OAM mode. The OAM-RS and the CSR-RS/SRS may be combined into one type of sounding signal. In this case, the transmit end needs to send only one type of sounding signal.

406: The transmit end determines the N OAM modes based on the OAM channel sounding result, and establishes a correspondence between the N OAM modes and a DMRS port. A process of establishing the correspondence between the N OAM modes and the DMRS port may be referred to as OAM mapping.

407: The transmit end modulates, by using an OAM mode that corresponds to a DMRS port obtained after OAM mapping, a DMRS and data on the DMRS port, to obtain a modulated DMRS and modulated data.

408: The transmit end sends the modulated DMRS and the modulated data to the receive end. Correspondingly, the receive end receives the DMRS and the data that are modulated by using the OAM mode and that are sent by the transmit end.

409: The receive end demodulates the received data based on the OAM mode.

It should be noted that, most current channel environments for transmitting OAM signals are known in advance, and no OAM transmission protocol is involved. However, a real channel environment cannot be learned of in advance. Therefore, according to the method provided in this application, OAM signal transmission can be applied to a real data transmission scenario.

According to the method provided in the foregoing embodiments of this application, based on conventional construction of a DMRS port through code division multiplexing, frequency division multiplexing, and time division multiplexing, this application proposes to increase a quantity of DMRSs and a quantity of DMRS ports through mode domain multiplexing, so that more DMRSs can be transmitted on a same time-frequency resource, and a quantity of simultaneously transmitted data streams can be increased, or fewer time-frequency resources are occupied when a same quantity of DMRSs are transmitted, thereby increasing time-frequency resources used for data transmission, and improving resource utilization. Specifically, if there are $N_{Mode\_Group}$ group modes, and inter-group modes remain orthogonal, a conventional time-frequency code domain resource corresponding to a DMRS port may correspond to $N_{DM\_RSwithModeGroup}$ DMRS ports after a mode domain resource is introduced, and $N_{DM\_RSwithModeGroup} \leq N_{Mode\_Group}$ is met. The following provides specific descriptions by using several examples.

Currently, there are two different types of DMRSs, which are respectively a type 1 and a type 2. In time-frequency resources corresponding to different types of DMRSs, arrangement manners of time-frequency resources used to send the DMRSs are different. Each type further includes a single-symbol DMRS and a dual-symbol DMRS. A symbol in this application is an orthogonal frequency division multiplexing (orthogonal frequency division multiplexing, OFDM) symbol. The following separately describes several mapping manners of different types of DMRSs in a conventional technology.

Type-1 single-symbol DMRS: As shown in FIG. 5, the DMRS occupies a single symbol. A maximum of four orthogonal DMRSs are supported to be carried through code domain multiplexing and frequency domain multiplexing. The four orthogonal DMRSs correspond to four DMRS ports, which are respectively a DMRS port 1000, a DMRS port 1001, a DMRS port 1002, and a DMRS port 1003. The DMRS port 1000 and the DMRS port 1001 use even-numbered subcarriers in frequency domain, and generate two mutually orthogonal DMRSs by using an orthogonal code (or an orthogonal sequence) whose length is 2. The DMRS port 1002 and the DMRS port 1003 use odd-numbered subcarriers in frequency domain, and also generate two mutually orthogonal DMRSs by using an orthogonal code whose length is 2. DMRS ports corresponding to a same time-frequency resource form one CDM group. In FIG. 5 and FIG. 6 to FIG. 10A and FIG. 10B below, each column represents a different symbol, and each row represents a different subcarrier.

Figure 6:
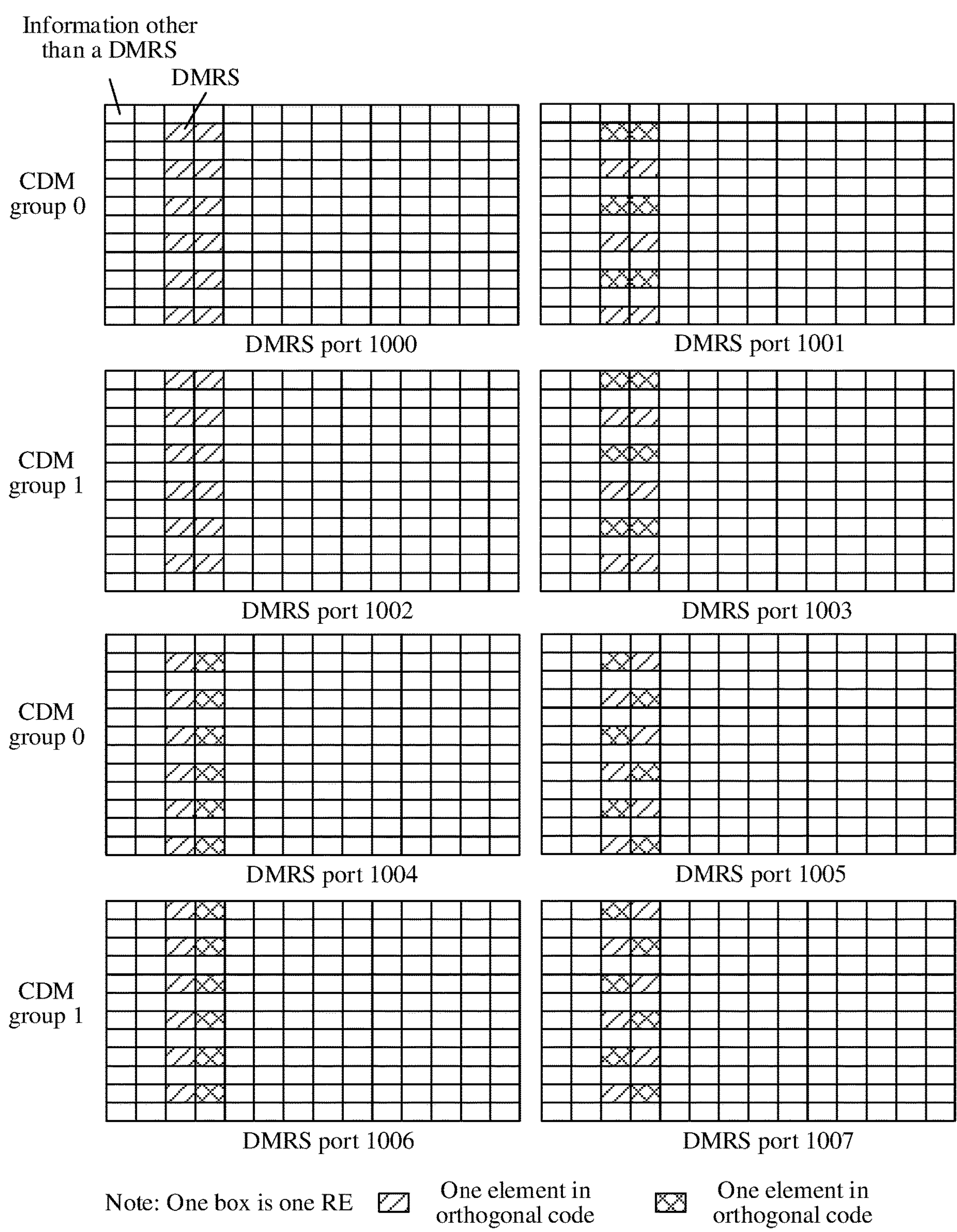
FIG. 6 is another schematic diagram of DMRS ports according to this application.

Type-1 dual-symbol DMRS: As shown in FIG. 6, the DMRS occupies two symbols. A maximum of eight orthogonal DMRSs are supported to be carried through code domain multiplexing and frequency domain multiplexing. The eight orthogonal DMRSs correspond to eight DMRS ports, which are respectively a DMRS port 1000 to a DMRS port 1007. Compared with that in FIG. 5, more orthogonal DMRSs and a larger quantity of DMRS ports can be supported by extending an orthogonal code whose length is 2 and odd and even subcarriers in time domain. The DMRS port 1000, the DMRS port 1001, the DMRS port 1004, and the DMRS port 1005 use even-numbered subcarriers in frequency domain, and use an orthogonal code whose length is 2 to generate four mutually orthogonal DMRSs. The DMRS port 1002, the DMRS port 1003, the DMRS port 1006, and the DMRS port 1007 use odd-numbered subcarriers in frequency domain, and also use an orthogonal code whose length is 2 to generate four mutually orthogonal DMRSs.

Figure 7:
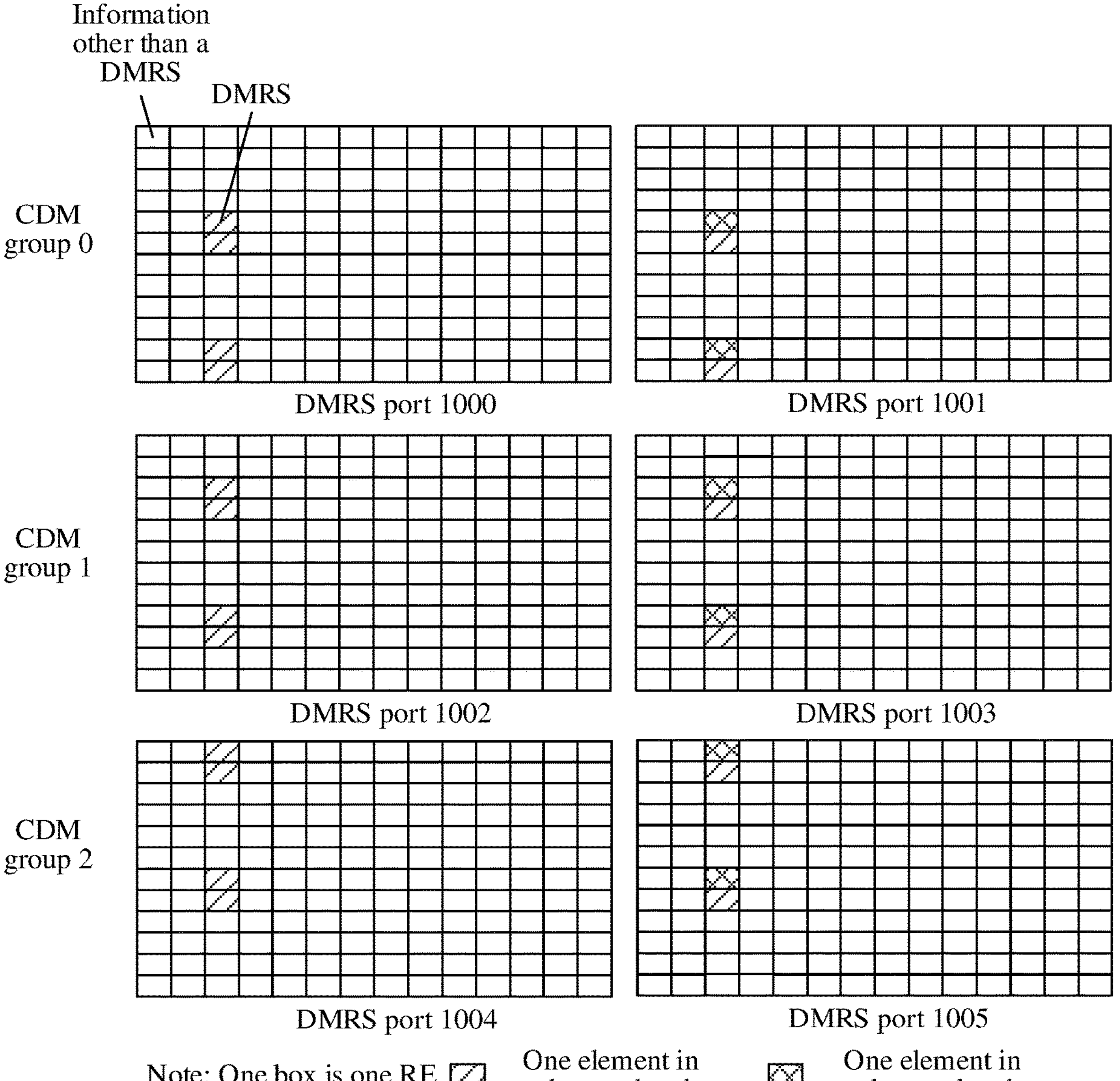
FIG. 7 is still another schematic diagram of DMRS ports according to this application.

Type-2 single-symbol DMRS: As shown in FIG. 7, the DMRS occupies a single symbol. A maximum of six orthogonal DMRSs are supported through code domain multiplexing and frequency domain multiplexing for the DMRS. The six orthogonal DMRSs correspond to six DMRS ports, which are respectively a DMRS port 1000 to a DMRS port 1005. Each CDM group occupies two adjacent subcarriers, and two DMRS ports in the CDM group are distinguished by using an orthogonal code whose length is 2. Different CDM groups occupy different frequency domain resources, to ensure orthogonality of DMRSs. It can be learned that, for the type-2 DMRS, more orthogonal DMRSs are obtained by sacrificing a density of the DMRSs in frequency domain.

A type-2 dual-symbol DMRS is similar to the type-1 dual-symbol DMRS, and is extended in time domain based on the type-2 single-symbol DMRS, and a maximum of 12 orthogonal DMRSs are supported. Reference may be made to the type-1 dual-symbol for understanding, and details are not described again.

The foregoing is a current DMRS mapping manner. In this application, several DMRS mapping manners obtained after a mode domain resource is introduced are as follows.

Figure 8:
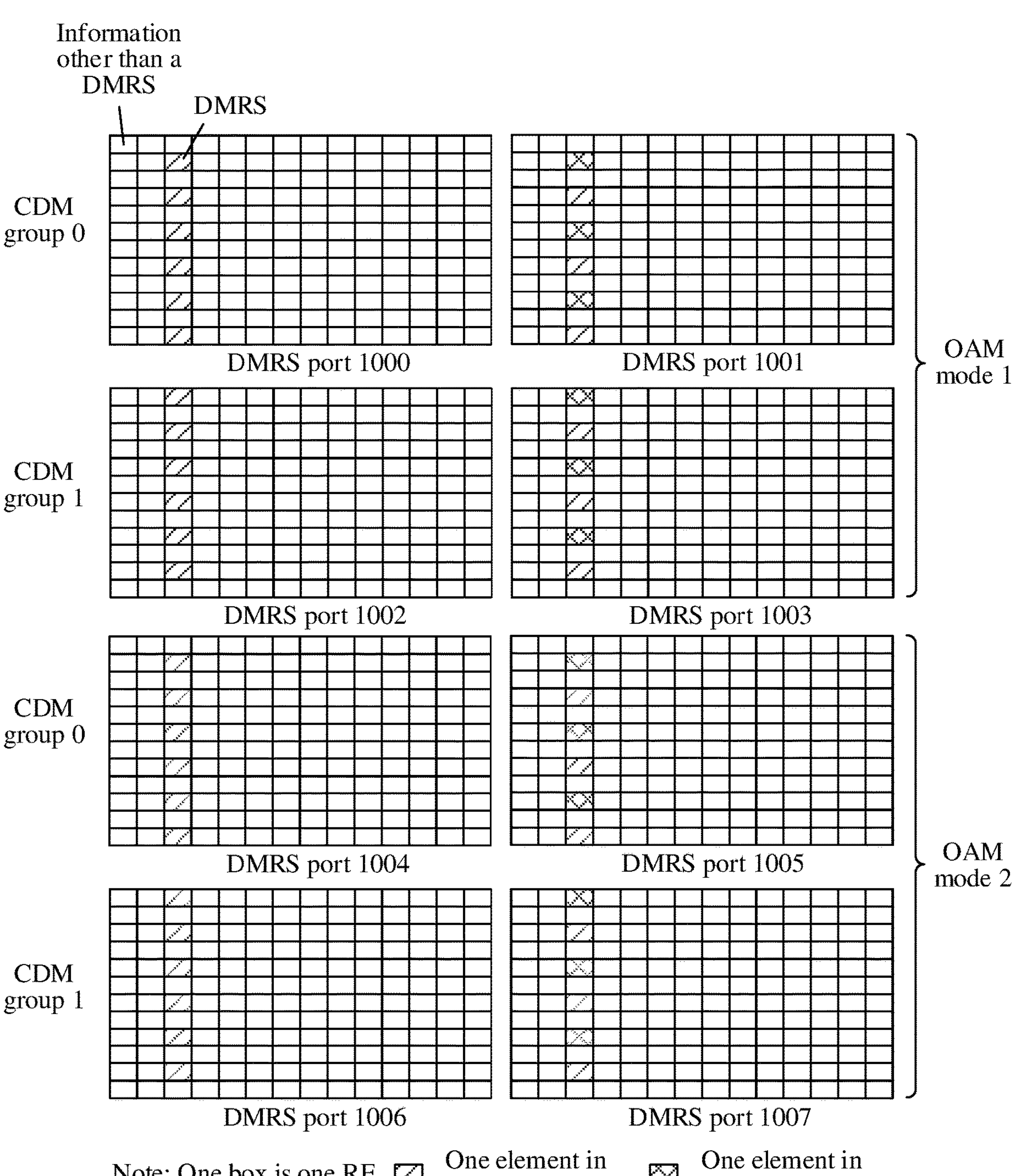
FIG. 8 is a schematic diagram of DMRS ports corresponding to different OAM modes according to this application.

Type-1 single-symbol DMRS: After the mode domain resource is introduced, conventional code domain and frequency domain multiplexing may be extended in mode domain. It is assumed that there are two OAM modes, which are respectively an OAM mode 1 and an OAM mode 2. As shown in FIG. 8, a maximum of eight orthogonal DMRSs may be supported, and correspond to eight DMRS ports, which are respectively a DMRS port 1000 to a DMRS port 1007. Specifically, the DMRS port 1000 to the DMRS port 1003 correspond to four orthogonal signals generated through frequency domain multiplexing and code domain multiplexing when the OAM mode is the OAM mode 1, and the DMRS port 1004 to the DMRS port 1007 correspond to four orthogonal signals generated through frequency domain multiplexing and code domain multiplexing when the OAM mode is the OAM mode 2. The OAM mode 1 may be a single mode (for example, a mode 1 and a mode 2) supported by the transmit end and the receive end, or may be a combination of a plurality of modes (for example, superimposition of the mode 1 and the mode 2). The OAM mode 2 is similar thereto. For the type-1 single-symbol DMRS, a quantity of DMRSs and a quantity of DMRS ports may be increased through three-dimensional frequency-code-mode domain multiplexing.

Figure 9A:
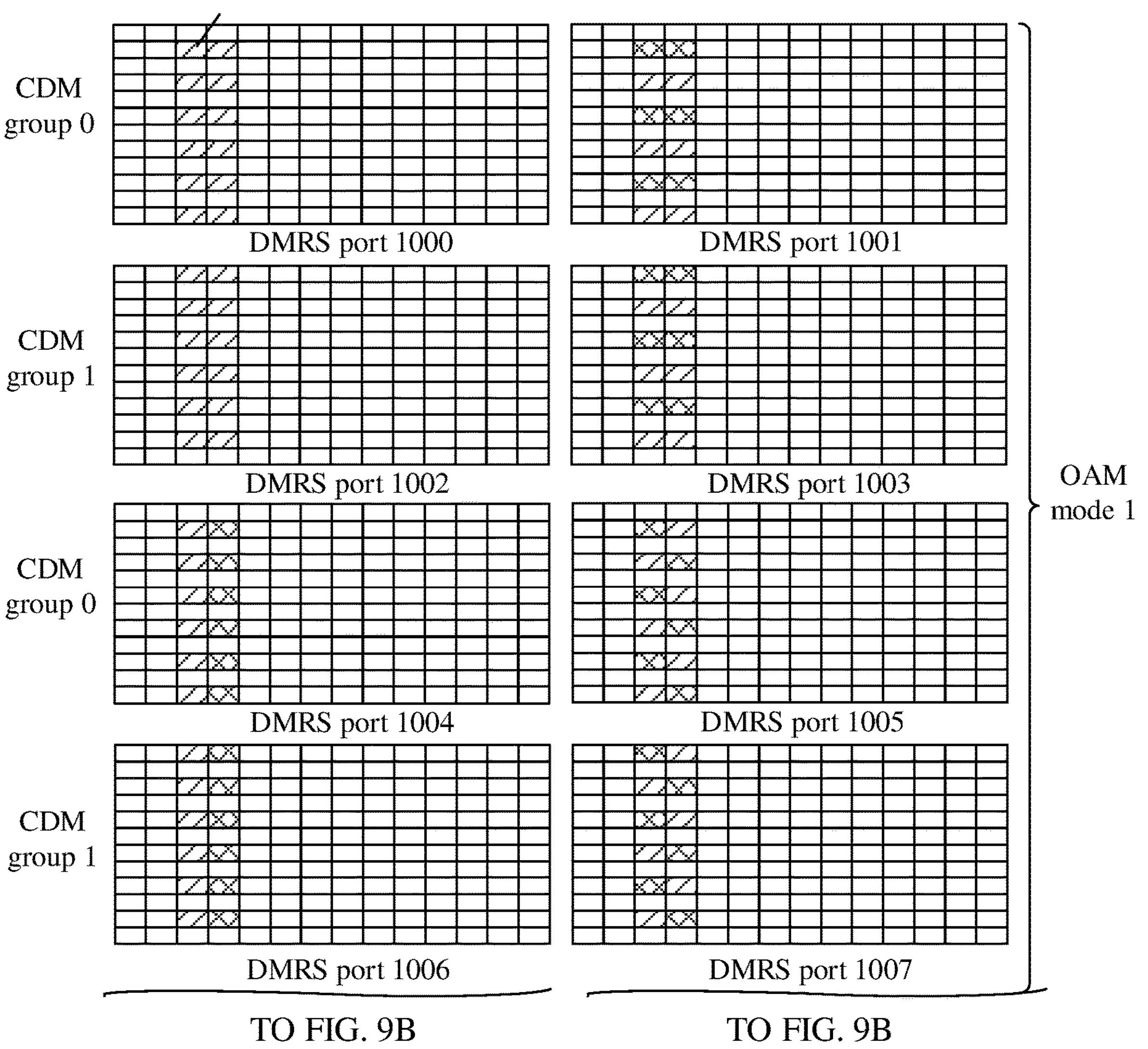
FIG. 9A and FIG. 9B are another schematic diagram of DMRS ports corresponding to different OAM modes according to this application.
Figure 9B:
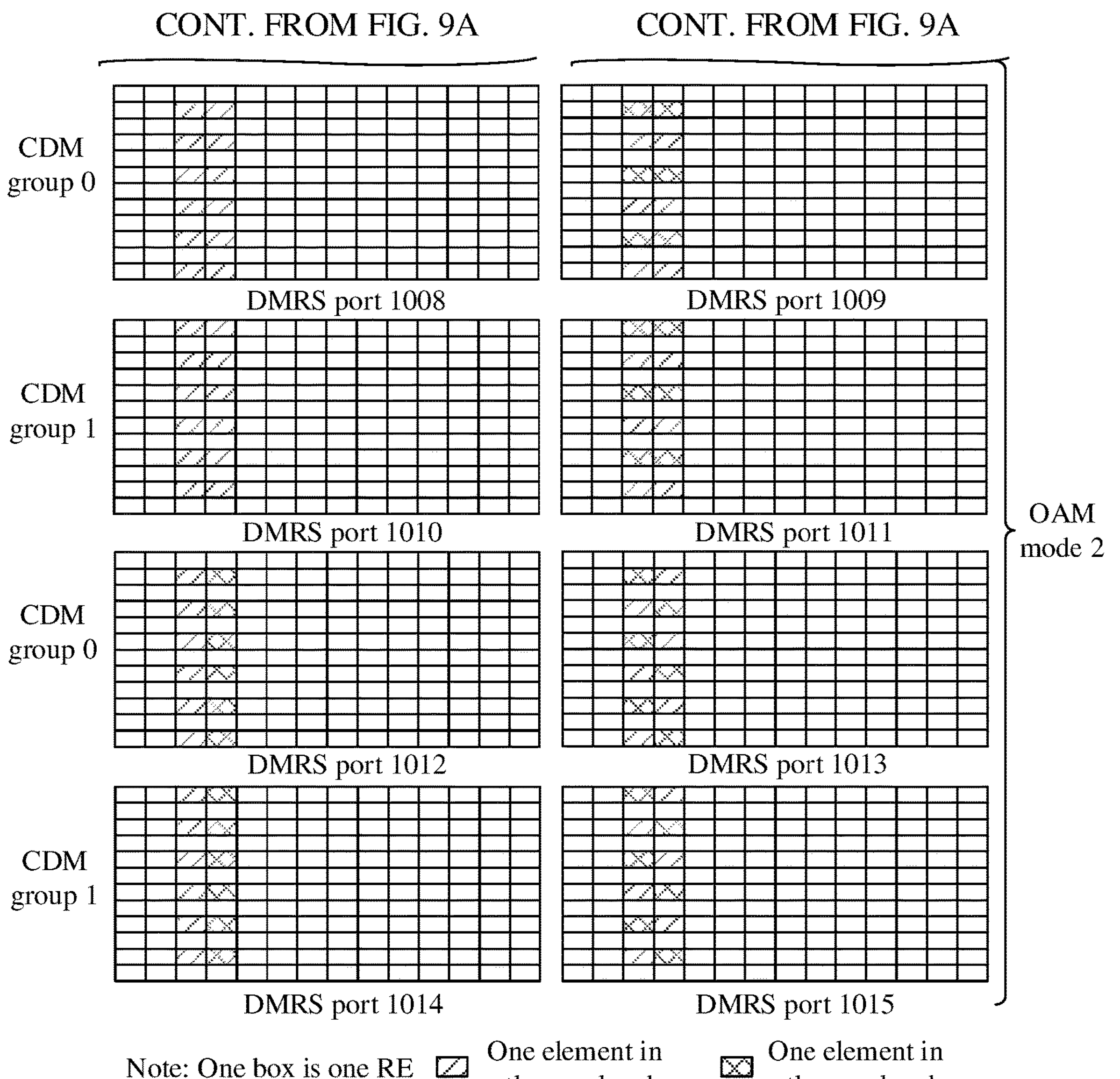

Type-1 dual-symbol DMRS: After the mode domain resource is introduced, conventional time domain, code domain, and frequency domain multiplexing may be extended in mode domain. It is assumed that there are two OAM modes, which are respectively an OAM mode 1 and an OAM mode 2. As shown in FIG. 9A and FIG. 9B, a maximum of 16 orthogonal DMRSs may be supported, and the 16 orthogonal DMRSs correspond to 16 DMRS ports, which are respectively a DMRS port 1000 to a DMRS port 1015. Specifically, the DMRS port 1000 to the DMRS port 1007 correspond to eight orthogonal signals generated through time domain multiplexing, frequency domain multiplexing, and code domain multiplexing when the OAM mode is the OAM mode 1, and the DMRS port 1008 to the DMRS port 1015 correspond to eight orthogonal signals generated through time domain multiplexing, frequency domain multiplexing, and code domain multiplexing when the OAM mode is the OAM mode 2. For related descriptions of the OAM mode 1 and the OAM mode 2, refer to the foregoing description. For the type-1 dual-symbol DMRS, a quantity of DMRSs and a quantity of DMRS ports may be increased through four-dimensional time-frequency-code-mode domain multiplexing.

Figure 10A:
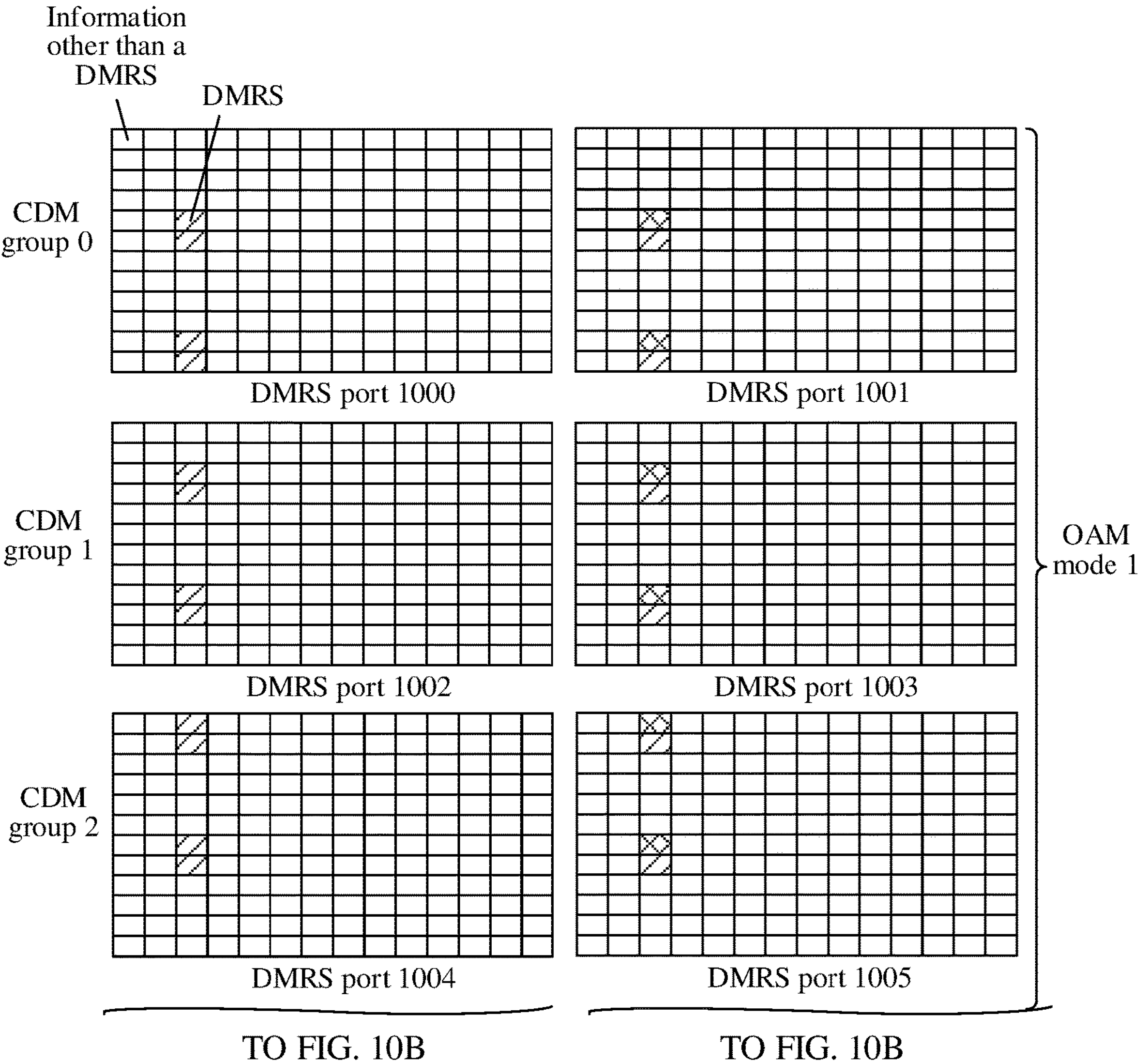
FIG. 10A and FIG. 10B are still another schematic diagram of DMRS ports corresponding to different OAM modes according to this application.
Figure 10B:
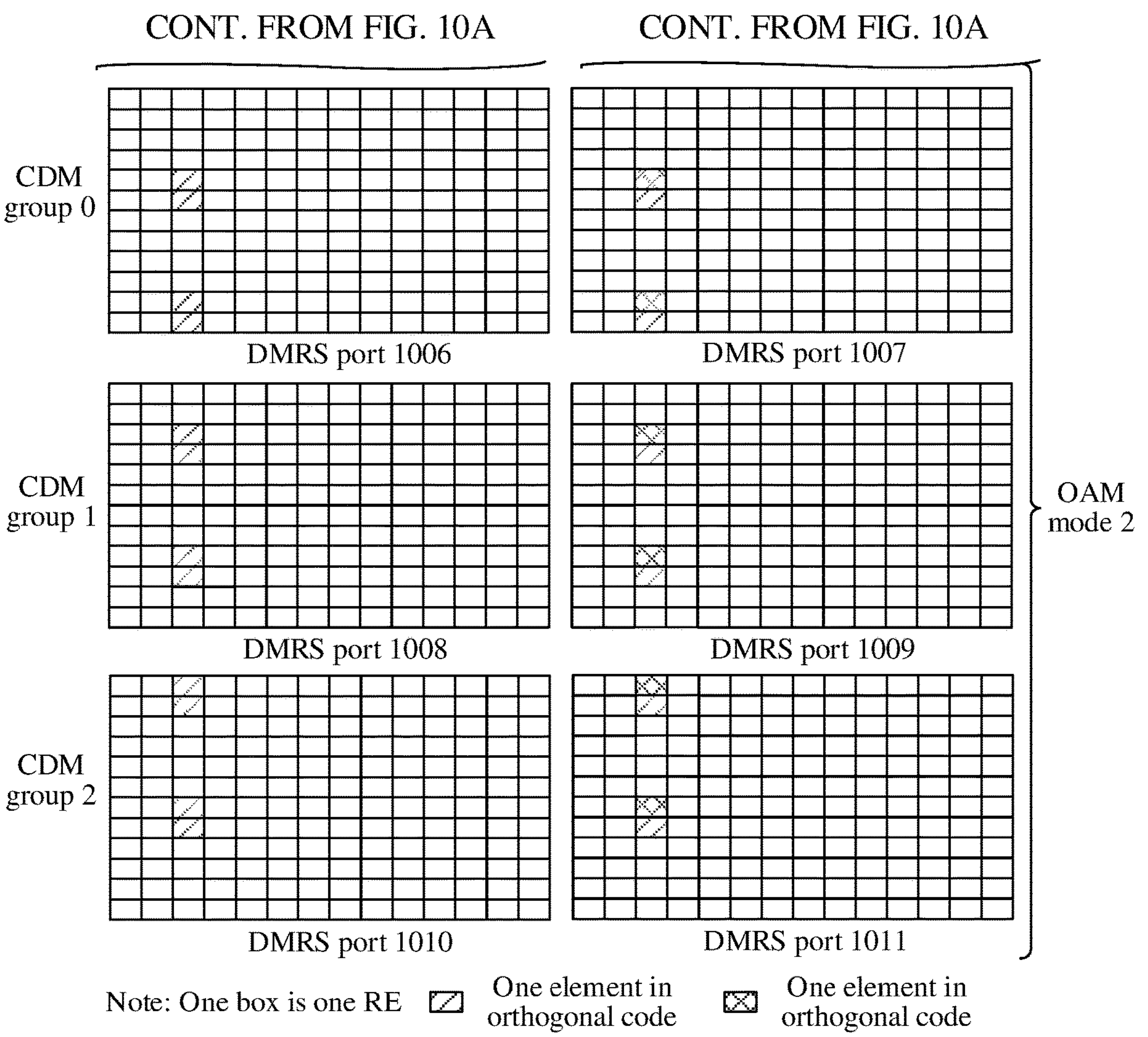

Type-2 single-symbol DMRS: After the mode domain resource is introduced, conventional code domain and frequency domain multiplexing may be extended in mode domain. It is assumed that there are two OAM modes, which are respectively an OAM mode 1 and an OAM mode 2. As shown in FIG. 10A and FIG. 10B, a maximum of 12 orthogonal DMRSs may be supported, and the 12 orthogonal DMRSs correspond to 12 DMRS ports, which are respectively a DMRS port 1000 to a DMRS port 1011. Specifically, the DMRS port 1000 to the DMRS port 1005 correspond to six orthogonal signals generated through frequency domain multiplexing and code domain multiplexing when the OAM mode is the OAM mode 1, and the DMRS port 1006 to the DMRS port 1011 correspond to six orthogonal signals generated through frequency domain multiplexing and code domain multiplexing when the OAM mode is the OAM mode 2. For related descriptions of the OAM mode 1 and the OAM mode 2, refer to the foregoing description. For the type-2 single-symbol DMRS, a quantity of DMRSs and a quantity of DMRS ports may be increased through three-dimensional frequency-code-mode domain multiplexing.

A type-2 dual-symbol DMRS is similar to the type-1 dual-symbol DMRS, and is extended in time domain and mode domain based on the type-2 single-symbol DMRS, and a maximum of 24 orthogonal DMRSs are supported. Reference may be made to the type-1 dual-symbol for understanding, and details are not described again.

A resource mapping order of the DMRS and the data may be: first mapping a mode domain resource, then mapping a code domain resource, and then mapping a time-frequency resource. In other words, the DMRS and the data are first mapped to DMRS ports that have a same time-frequency resource and a same code domain resource but have different mode domain resources, then mapped to DMRS ports that have a same time-frequency resource but have different code domain resources and different mode domain resources, and then mapped to DMRS ports that have different time-frequency resources. This mapping manner can fully save time-frequency resources.

For example, the type-1 single-symbol DMRS that is based on three-dimensional frequency-code-mode domain multiplexing and that is shown in FIG. 8 is used as an example. A DMRS and data are first mapped to DMRS ports (for example, a DMRS port 1000 and a DMRS port 1004) that have a same time-frequency resource and a same code domain resource but have different OAM modes, then mapped to DMRS ports (for example, a DMRS port 1001 and a DMRS port 1005) that have a same time-frequency resource, different orthogonal codes, and different OAM modes, and then mapped to DMRS ports (for example, a DMRS port 1002, a DMRS port 1003, a DMRS port 1006, and a DMRS port 1007) that have a same time domain resource, different orthogonal codes, different OAM modes, and different frequency domain resources.

In addition, this application further proposes air interface signaling indicating DMRS mapping, including signaling indicating whether mode domain multiplexing is used during DMRS mapping, signaling indicating an OAM mode used when mode domain multiplexing is used, signaling indicating an OAM mode supported on a time-frequency resource used to send a DMRS in time-frequency resources corresponding to each DMRS port, and the like.

Based on the OAM mode indicated in the foregoing embodiment, the following describes application of the OAM mode in this application by using an example. Specifically, the following scenario 1, scenario 2, or scenario 3 may be used as an example for description.

Scenario 1: Transmission Solution in which Single-User Conventional MIMO is Combined with OAM In the scenario 1, data and a DMRS that carry one group of OAM modes are sent by using one or more antenna elements, and data and a DMRS that carry another group of OAM modes are sent by using another one or more antenna elements. Different OAM mode groups may include one or more same modes, or may include different OAM modes.

Figure 11:
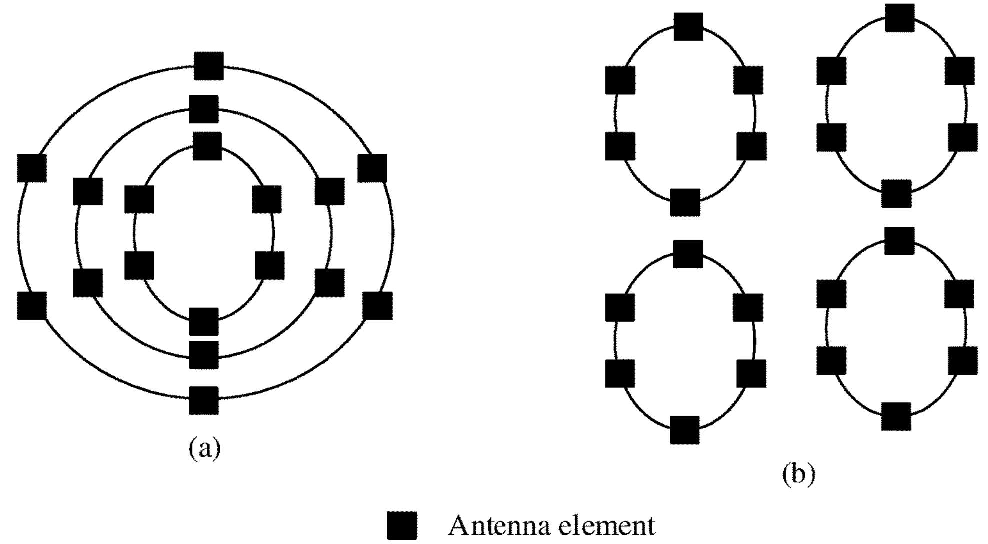
FIG. 11 is a schematic diagram of sorting when an antenna element sends an OAM beam according to this application.

For example, refer to (a) in FIG. 11. An arrangement manner of UCAs may be a concentric circle manner. Refer to (b) in FIG. 11. An arrangement manner of UCAs may alternatively be a parallel form. The transmit end may send, in each circle of UCA, data and a DMRS that carry a group of OAM modes (for example, OAM modes {0, ±1, ±2}), or may send, in all UCAs, data and a DMRS that carry a group of OAM modes. The receive end may demodulate, based on orthogonality between OAM modes, data that carries different OAM modes, and then demodulate, based on a MIMO equalization algorithm, data that carries a same OAM mode but is sent by using antenna elements at different locations.

Figure 12:
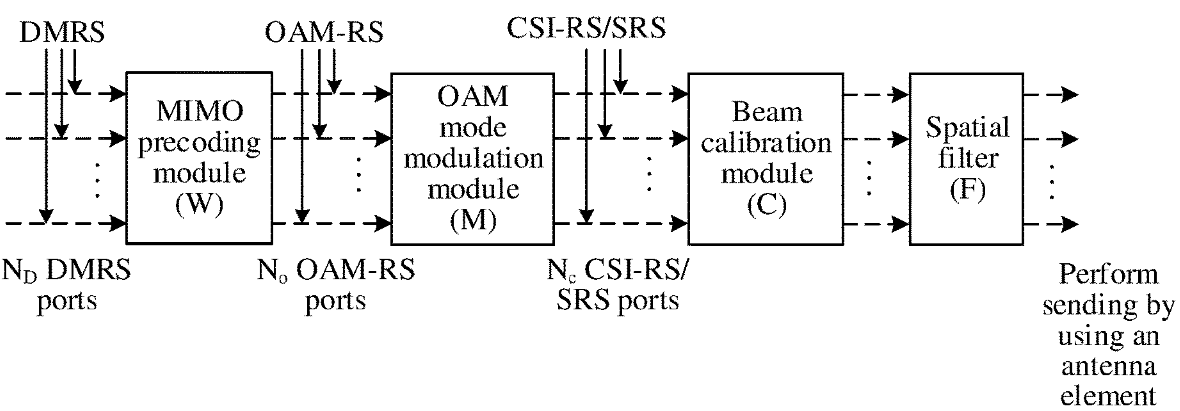
FIG. 12 is a schematic diagram of signal processing performed by a transmit end according to this application.

In the scenario 1, refer to FIG. 12. The transmit end mainly includes four modules (a MIMO precoding module, an OAM mode modulation module, a beam calibration module, and a spatial filter) and three different types of reference signals (a DMRS, an OAM-RS, and a CSI-RS/SRS). It should be noted that the four modules and the three reference signals may not simultaneously exist, or two or more modules or reference signals may be combined into one module or reference signal. Locations may also be adjusted between modules, between reference signals, and between a module and a reference signal. Details are not described herein.

A process of processing the data and the DMRS by the transmit end mainly includes: (1) precoding the data and the DMRS by using the MIMO precoding module; (2) performing OAM mode modulation on an output of the MIMO precoding module or the OAM-RS by using the OAM mode modulation module; (3) performing beam calibration on an output of the OAM mode modulation module or the CSI-RS/SRS by using the beam calibration module; (4) performing spatial filtering on an output of the beam calibration module by using the spatial filter; and (5) sending a signal output by the spatial filter. The sending may be performed through a UCA when step (5) is performed.

The functions of the modules are as follows.

The MIMO precoding module is mainly configured to precode the data and the DMRS. An input thereof is DMRSs and data on a plurality of DMRS ports. A precoding matrix used by the MIMO precoding module may be determined based on an OAM channel sounding result obtained after channel sounding is performed on an OAM-RS port by using an OAM-RS. The MIMO precoding module may separately precode DMRSs and data on DMRS ports that correspond to different OAM modes, or may jointly precode DMRSs and data on DMRS ports that correspond to different OAM modes. This is not limited in this application. A correspondence between the OAM mode and the DMRS port may be allocated in advance before precoding.

For example, before the MIMO precoding module performs precoding, data is mapped to the DMRS port shown in FIG. 8, FIG. 9A and FIG. 9B, or FIG. 10A and FIG. 10B in a specific manner. A type-1 single-symbol DMRS shown in FIG. 8 is used as an example. It is assumed that eight streams of data are simultaneously transmitted, and the data streams are mapped to DMRS ports (where for example, one data stream may be mapped to one DMRS port, that is, the data streams are in a one-to-one correspondence with the DMRS ports). A DMRS port 1000 to a DMRS port 1003 may determine, based on an OAM channel sounding result obtained after corresponding channel sounding, a precoding matrix corresponding to an OAM mode 1, and a DMRS port 1004 to a DMRS port 1007 may determine, based on an OAM channel sounding result obtained after corresponding channel sounding, a precoding matrix corresponding to an OAM mode 2.

The OAM mode modulation module is mainly configured to modulate a signal by using an OAM mode, to complete generation of an OAM beam, where the generation may be performed in an analog manner or the generation may be performed in a digital manner. An output is a beam that carries a DMRS and data of the OAM mode (that is, an OAM beam that carries the DMRS and the data).

The OAM mode (that is, the foregoing N OAM modes) used by the module may be determined in any one or more of the following manner (1) to manner (4).

Manner (1): Determining is performed based on a channel sounding result obtained after channel sounding is performed on a CSI-RS/SRS port by using a CSI-RS/SRS.

Manner (2): Determining is performed based on feedback information of the receive end (for example, a channel sounding result or an OAM channel sounding result).

Manner (3): Determining is performed based on an indication of the transmit end (for example, an upper-layer indication of the transmit end).

Manner (4): One or more initial OAM modes are determined, and then a used OAM mode is determined after channel sounding is performed by sending an OAM-RS on an OAM-RS port. The initial OAM mode may be determined in any one or more of the manner (1) to the manner (3).

It should be noted that different OAM beams generated by the module may correspond to a same OAM mode, or may correspond to different OAM modes. This is not limited in this application. If the different OAM beams correspond to the same OAM mode, the different OAM beams may be sent by using different antenna elements.

One or more OAM beams with different mode values generated by the module may also be used to determine an OAM mode set during DMRS port mapping. However, because orthogonality of one or more OAM beams with a same mode value is not determined, the one or more OAM beams cannot be directly used for mapping between a DMRS signal and a port. In other words, if the transmit end cannot use a specific OAM mode, a correspondence cannot be established between the OAM mode and a DMRS port, that is, the OAM mode does not belong to the foregoing N OAM modes.

It should be noted that, during modulation, if the module can determine orthogonality of OAM beams that carry a same OAM mode, for example, determine, by using a channel sounding result, orthogonality of the OAM beams that carry the same OAM mode in space domain, a quantity of DMRSs and a quantity of DMRS ports may be further extended in space domain.

The beam calibration module is mainly configured to complete beam adjustment and beamforming, and output a signal after beamforming. An input may be a CSI-RS/SRS, or a signal output by a previous module.

A beam adjustment manner used by the module may be determined in any one or more of the following manner (5) to manner (7).

Manner (5): Determining is performed based on feedback (for example, received signal strength or the beam adjustment manner) of the receive end about beam adjustment.

Manner (6): Completion is performed based on an indication of the transmit end (for example, an indication of an initial location or a default adjustment manner of an upper layer of the transmit end).

Manner (7): An initial adjustment manner is determined, and then a to-be-used beam adjustment manner is determined after channel sounding is performed by sending a CSI-RS/SRS on a CSI-RS/SRS port. In addition to being used for beam adjustment and beam-forming, the channel sounding result obtained after channel sounding performed by using the CSI-RS/SRS is also used to determine whether the radio environment is suitable for transmitting an OAM signal, and determine whether to enable mode domain multiplexing during DMRS port mapping. The initial adjustment manner may be determined in the manner (5) and/or the manner (6).

The spatial filter is configured to complete a mapping relationship between a logical antenna port and a physical antenna, where the antenna port may be an output port of the beam calibration module, or the antenna port may be directly a CSI-RS/SRS port (that is, an input signal is a CSI-RS/SRS or data) if there is no beam calibration module.

Scenario 2: Pure OAM Transmission Solution

In the scenario 2, all antenna elements send data and DMRSs that carry a group of OAM modes (for example, OAM modes {0, ±1, ±2, ±3}). In this case, the receive end may directly demodulate the data based on orthogonality between the OAM modes.

In the scenario 2, a process of processing the DMRSs and the data by the transmit end and the receive end is similar to that in the scenario 1. A difference lies in that in a pure OAM transmission scenario, a case in which a same OAM mode is transmitted does not exist. Therefore, there may be no MIMO precoding module, or the precoding matrix is a unit matrix. In this case, a process of processing the DMRSs and the data may include: determining an OAM mode domain resource (that is, the foregoing N OAM modes) after channel sounding is performed by using an OAM-RS, and then determining a correspondence between a DMRS port and an OAM mode. During data transmission, the data may be mapped to different DMRS ports for simultaneous transmission, mapped to a physical antenna through the OAM mode modulation module, the beam calibration module, and the spatial filter, and transmitted to a channel in a form of different OAM beams.

Scenario 3: Transmission Solution in which Conventional Multi-User MIMO is Combined with OAM Scenario 3 is a multi-user scenario of the scenario 1 or the scenario 2. When there are a plurality of terminals, each of the terminals may use the methods shown in the foregoing scenario 1 and scenario 2. A difference lies in that, to ensure orthogonality, DMRSs of different terminals preferably occupy different time domain resources, different frequency domain resources, or different code domain resources. Therefore, when a quantity of DMRS ports is increased through extension in mode domain, a time-frequency resource occupied by a single terminal can be reduced, thereby helping support more terminals that perform simultaneous transmission.

Figure 13:
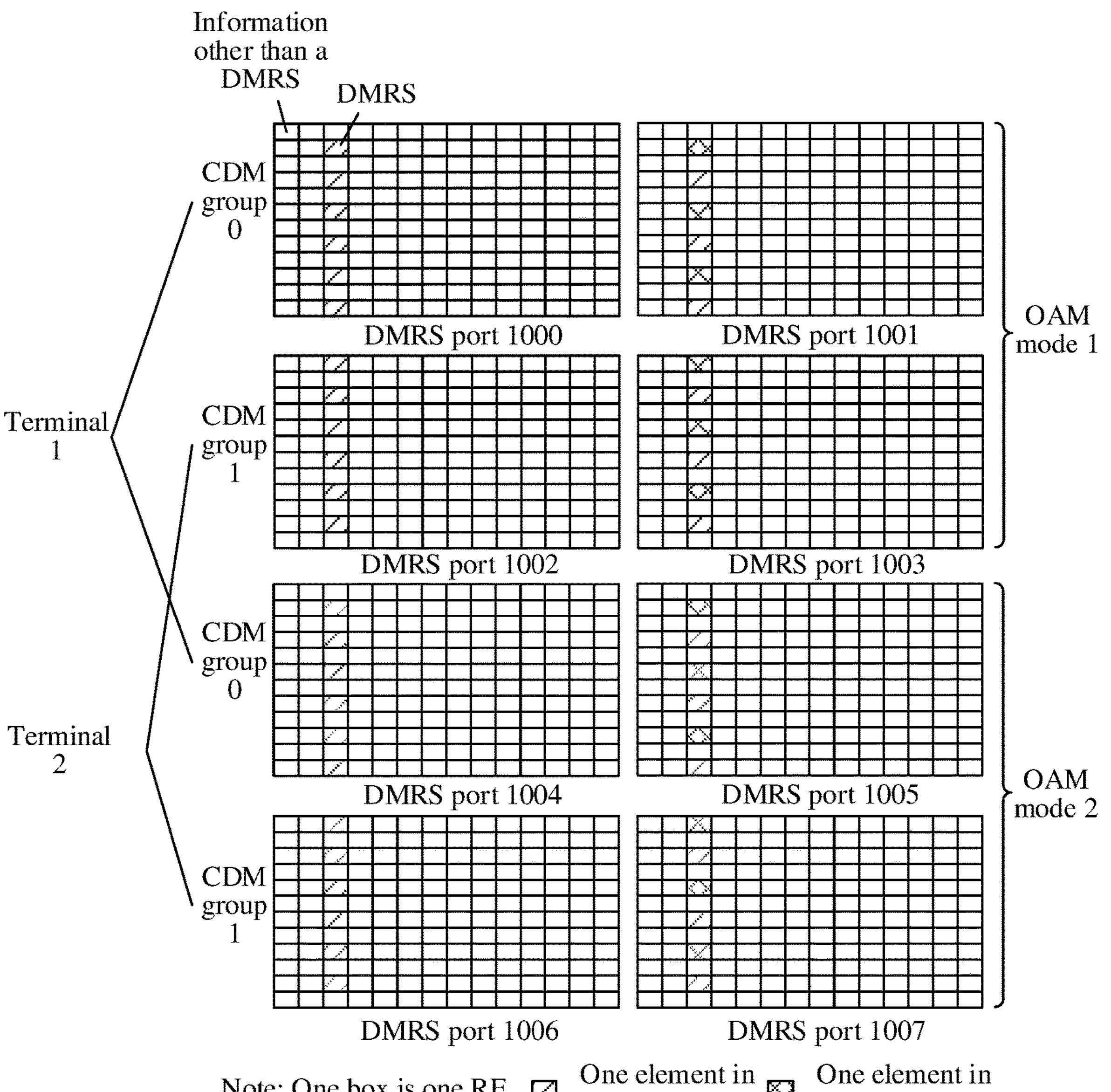
FIG. 13 is a schematic diagram of allocating DMRS ports to different terminals according to this application.

For example, three-dimensional frequency-code-mode domain multiplexing of a type-1 single-symbol DMRS shown in FIG. 8 is used as an example. If there are two terminals, as shown in FIG. 13, a DMRS port 1000, a DMRS port 1001, a DMRS port 1004, and a DMRS port 1005 are allocated to a terminal 1 to transmit a DMRS and data, and a DMRS port 1002, a DMRS port 1003, a DMRS port 1006, and a DMRS port 1007 are allocated to a terminal 2 to transmit a DMRS and data. The DMRS ports of the terminal 1 and the terminal 2 occupy different frequency domain resources. For the four DMRS ports allocated to the terminal 1, a same mode domain resource but different code domain resources are occupied between the DMRS port 1000 and the DMRS port 1001 and between the DMRS port 1004 and the DMRS port 1005.

In the scenario 3, the quantity of DMRS ports is increased by extension in mode domain, to reduce a time-frequency resource occupied by each of the terminals, thereby helping support more terminals that perform simultaneous transmission.

The foregoing scenario 1 to scenario 3 provide DMRS and data transmission manners in various scenarios of the transmit end and the receive end during wireless transmission.

The methods provided in the foregoing embodiments of this application may indicate a manner in which an OAM mode is applied to DMRS port mapping, including whether to enable mode domain multiplexing during DMRS port mapping, an OAM mode jointly supported by the receive end and the transmit end, an OAM mode supported by a time-frequency resource corresponding to each DMRS port, OAM modes supported by time-frequency resources corresponding to all DMRS ports, and the like.

This application proposes a DMRS mapping manner after a mode domain resource is introduced, including a DMRS mapping manner of three-dimensional frequency-code-mode domain multiplexing and a DMRS mapping manner of four-dimensional time-frequency-code-mode domain multiplexing, and proposes a signaling interaction procedure of the transmit end and the receive end in the scenario in which conventional MIMO is combined with OAM and in the pure OAM transmission scenario, and a DMRS and data transmission manner in a multi-user scenario during wireless transmission.

The foregoing mainly describes the solutions of embodiments of this application from a perspective of a method. It may be understood that, to implement the foregoing functions, each network element, for example, the first communication apparatus and the second communication apparatus, includes at least one of a corresponding hardware structure or software module for performing each function. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the first communication apparatus and the second communication apparatus may be divided into functional units based on the foregoing method examples. For example, each functional unit may be obtained through division based on each corresponding function, or two or more functions may be integrated into one processing unit. The integrated unit may be implemented in a form of hardware, or may be implemented in a form of a software functional unit. It should be noted that, in embodiments of this application, division into the units is an example, and is merely logical function division. During actual implementation, another division manner may be used.

Figure 14:
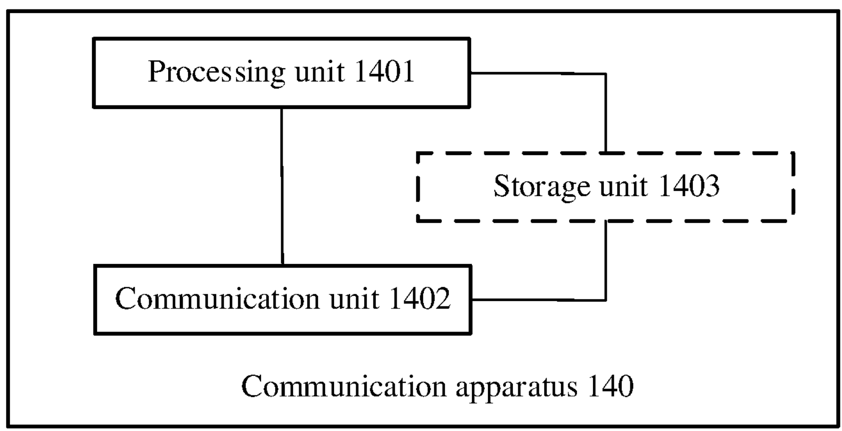
FIG. 14 is a schematic diagram of composition of a communication apparatus according to this application.

For example, FIG. 14 is a possible schematic diagram of a structure of a communication apparatus (denoted as a communication apparatus 140) in the foregoing embodiments. The communication apparatus 140 includes a processing unit 1401 and a communication unit 1402. Optionally, the apparatus further includes a storage unit 1403. The communication apparatus 140 may be configured to show structures of the first communication apparatus and the second communication apparatus in the foregoing embodiments.

When the schematic diagram of the structure shown in FIG. 14 is used to show a structure of the first communication apparatus in the foregoing embodiments, the processing unit 1401 is configured to control and manage actions of the first communication apparatus. For example, the processing unit 1401 is configured to perform 300 and 301 in FIGS. 3, 401 to 408 in FIG. 4 (in this case, the first communication apparatus is a transmit end), 401, 402, 404, 405, 408, and 409 in FIG. 4 (in this case, the first communication apparatus is a receive end), and/or an action performed by the first communication apparatus in another process described in embodiments of this application. The processing unit 1401 may communicate with another network entity by using the communication unit 1402, for example, communicate with the second communication apparatus in FIG. 3. The storage unit 1403 is configured to store program code and data that are of the first communication apparatus.

When the schematic diagram of the structure shown in FIG. 14 is used to show a structure of the second communication apparatus in the foregoing embodiments, the processing unit 1401 is configured to control and manage actions of the second communication apparatus. For example, the processing unit 1401 is configured to perform 302 in FIGS. 3, 401 to 408 in FIG. 4 (in this case, the second communication apparatus is a transmit end), 401, 402, 404, 405, 408, and 409 in FIG. 4 (in this case, the second communication apparatus is a receive end), and/or an action performed by the second communication apparatus in another process described in embodiments of this application. The processing unit 1401 may communicate with another network entity by using the communication unit 1402, for example, communicate with the first communication apparatus in FIG. 3. The storage unit 1403 is configured to store program code and data that are of the second communication apparatus.

For example, the communication apparatus 140 may be a device, or may be a chip or a chip system.

When the communication apparatus 140 is a device, the processing unit 1401 may be a processor, and the communication unit 1402 may be a communication interface, a transceiver, or an input interface and/or an output interface. Optionally, the transceiver may be a transceiver circuit. Optionally, the input interface may be an input circuit, and the output interface may be an output circuit.

When the communication apparatus 140 is a chip or a chip system, the communication unit 1402 may be a communication interface, an input interface and/or an output interface, an interface circuit, an output circuit, an input circuit, a pin, a related circuit, or the like on the chip or the chip system. The processing unit 1401 may be a processor, a processing circuit, a logic circuit, or the like.

When the integrated unit in FIG. 14 is implemented in a form of a software functional module and sold or used as an independent product, the integrated unit may be stored in a computer-readable storage medium. Based on such an understanding, the technical solutions of embodiments of this application essentially, or a part that makes contributions to a conventional technology, or all or some of the technical solutions, may be implemented in a form of a software product. The computer software product is stored in a storage medium and includes several computer-executable instructions for instructing a computer device (which may be a personal computer, a server, a network device, or the like) or a processor (processor) to perform all or some of the steps of the methods described in embodiments of this application. The storage medium that stores the computer software product includes any medium that can store program code, such as a USB flash drive, a removable hard disk drive, a read-only memory (read-only memory, ROM), a random access memory (random access memory, RAM), a magnetic disk, or an optical disc.

Figure 15:
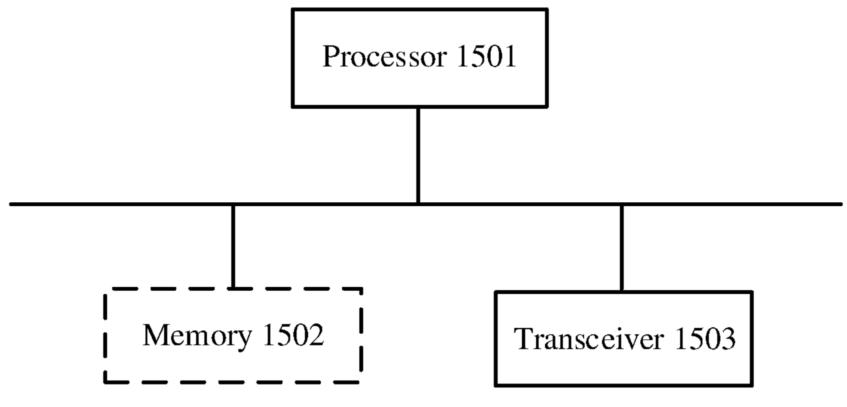
FIG. 15 is a schematic diagram of a hardware structure of a communication apparatus according to this application.
Figure 16:
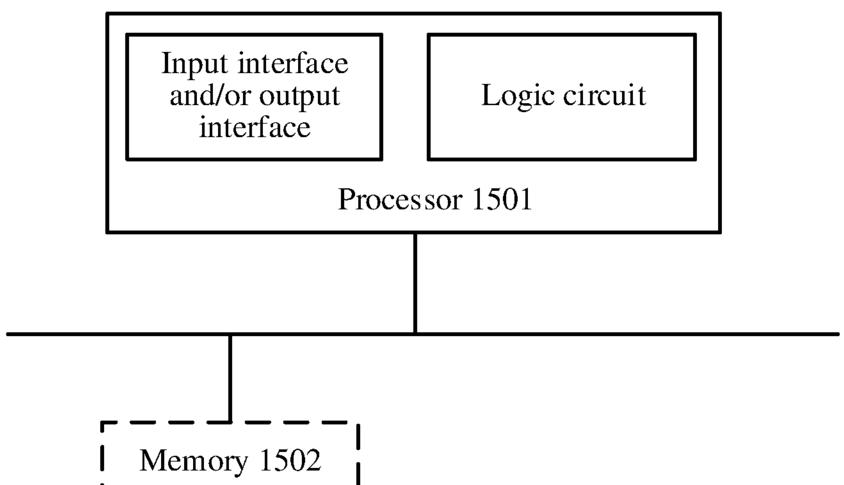
FIG. 16 is a schematic diagram of a hardware structure of another communication apparatus according to this application.

An embodiment of this application further provides a schematic diagram of a hardware structure of a communication apparatus. Refer to FIG. 15 or FIG. 16. The communication apparatus includes a processor 1501. Optionally, the apparatus further includes a memory 1502 connected to the processor 1501.

The processor 1501 may be a general-purpose central processing unit (central processing unit, CPU), a microprocessor, an application-specific integrated circuit (application-specific integrated circuit, ASIC), or one or more integrated circuits configured to control program execution of the solutions of this application. The processor 1501 may alternatively include a plurality of CPUs, and the processor 1501 may be a single-core (single-CPU) processor or a multi-core (multi-CPU) processor. The processor herein may be one or more devices, circuits, and/or processing cores configured to process data (for example, computer-executable instructions).

The memory 1502 may be a ROM or another type of static storage device that can store static information and computer-executable instructions, a RAM or another type of dynamic storage device that can store information and computer-executable instructions, or may be an electrically erasable programmable read-only memory (electrically erasable programmable read-only memory, EEPROM), a compact disc read-only memory (compact disc read-only memory, CD-ROM) or another optical disc storage, an optical disc storage (including a compact optical disc, a laser disc, an optical disc, a digital versatile disc, a Blu-ray disc, or the like), a magnetic storage medium or another magnetic storage device, or any other medium that can be configured to carry or store expected program code in a form of computer-executable instructions or a data structure and that can be accessed by a computer. This is not limited in embodiments of this application. The memory 1502 may exist independently (where in this case, the memory 1502 may be located outside the communication apparatus, or may be located inside the communication apparatus), or may be integrated with the processor 1501. The memory 1502 may include computer program code. The processor 1501 is configured to execute the computer program code stored in the memory 1502, to implement the method provided in embodiments of this application.

In a first possible implementation, as shown in FIG. 15, the communication apparatus further includes a transceiver 1503. The processor 1501, the memory 1502, and the transceiver 1503 are connected through a bus. The transceiver 1503 is configured to communicate with another device or a communication network. Optionally, the transceiver 1503 may include a transmitter machine and a receiver machine. A component configured to implement a receiving function in the transceiver 1503 may be considered as a receiver machine. The receiver machine is configured to perform a receiving step in embodiments of this application. A component configured to implement a sending function in the transceiver 1503 may be considered as a transmitter machine. The transmitter machine is configured to perform a sending step in embodiments of this application. In this possible implementation, for example, the processor 1501 may perform an action performed by the processing unit 1401, the transceiver 1503 may perform an action performed by the communication unit 1402, and a function of the memory 1502 may be the same as that of the storage unit 1403.

Based on the first possible implementation, the schematic diagram of the structure shown in FIG. 15 may be used to show structures of the first communication apparatus and the second communication apparatus in the foregoing embodiments.

When the schematic diagram of the structure shown in FIG. 15 is used to show the structure of the first communication apparatus in the foregoing embodiments, the processor 1501 is configured to control and manage actions of the first communication apparatus. For example, the processor 1501 is configured to perform 300 and 301 in FIGS. 3, 401 to 408 in FIG. 4 (in this case, the first communication apparatus is a transmit end), 401, 402, 404, 405, 408, and 409 in FIG. 4 (in this case, the first communication apparatus is a receive end), and/or an action performed by the first communication apparatus in another process described in embodiments of this application. The processor 1501 may communicate with another network entity by using the transceiver 1503, for example, communicate with the second communication apparatus in FIG. 3. The memory 1502 is configured to store program code and data that are of the first communication apparatus.

When the schematic diagram of the structure shown in FIG. 15 is used to show the structure of the second communication apparatus in the foregoing embodiments, the processor 1501 is configured to control and manage actions of the second communication apparatus. For example, the processor 1501 is configured to perform 302 in FIGS. 3, 401 to 408 in FIG. 4 (in this case, the second communication apparatus is a transmit end), 401, 402, 404, 405, 408, and 409 in FIG. 4 (in this case, the second communication apparatus is a receive end), and/or an action performed by the second communication apparatus in another process described in embodiments of this application. The processor 1501 may communicate with another network entity by using the transceiver 1503, for example, communicate with the first communication apparatus in FIG. 3. The memory 1502 is configured to store program code and data that are of the second communication apparatus.

In a second possible implementation, the processor 1501 includes a logic circuit, and an input interface and/or an output interface. For example, the output interface is configured to perform a sending action in a corresponding method, and the input interface is configured to perform a receiving action in the corresponding method. In this possible implementation, for example, the processor 1501 may perform an action performed by the processing unit 1401, the input interface and/or the output interface may perform an action performed by the communication unit 1402, and a function of the memory 1502 may be the same as that of the storage unit 1403.

Based on the second possible implementation, the schematic diagram of the structure shown in FIG. 16 may be used to show structures of the first communication apparatus and the second communication apparatus in the foregoing embodiments.

When the schematic diagram of the structure shown in FIG. 16 is used to show the structure of the first communication apparatus in the foregoing embodiments, the processor 1501 is configured to control and manage actions of the first communication apparatus. For example, the processor 1501 is configured to perform 300 and 301 in FIGS. 3, 401 to 408 in FIG. 4 (in this case, the first communication apparatus is a transmit end), 401, 402, 404, 405, 408, and 409 in FIG. 4 (in this case, the first communication apparatus is a receive end), and/or an action performed by the first communication apparatus in another process described in embodiments of this application. The processor 1501 may communicate with another network entity by using an input interface and/or an output interface, for example, communicate with the second communication apparatus in FIG. 3. The memory 1502 is configured to store program code and data that are of the first communication apparatus.

When the schematic diagram of the structure shown in FIG. 16 is used to show the structure of the second communication apparatus in the foregoing embodiments, the processor 1501 is configured to control and manage actions of the second communication apparatus. For example, the processor 1501 is configured to perform 302 in FIGS. 3, 401 to 408 in FIG. 4 (in this case, the second communication apparatus is a transmit end), 401, 402, 404, 405, 408, and 409 in FIG. 4 (in this case, the second communication apparatus is a receive end), and/or an action performed by the second communication apparatus in another process described in embodiments of this application. The processor 1501 may communicate with another network entity by using an input interface and/or an output interface, for example, communicate with the first communication apparatus in FIG. 3. The memory 1502 is configured to store program code and data that are of the second communication apparatus.

In an implementation process, steps in the method provided in the embodiments may be completed by using an integrated logic circuit of hardware in the processor or computer-executable instructions in a form of software. The steps of the method disclosed with reference to embodiments of this application may be directly performed by a hardware processor, or may be performed by using a combination of hardware in the processor and a software module.

An embodiment of this application further provides a computer-readable storage medium, including computer-executable instructions. When the computer-executable instructions run on a computer, any method in the foregoing embodiments is enabled to be performed.

An embodiment of this application further provides a computer program product including computer-executable instructions. When the computer program product runs on a computer, the computer is enabled to perform any method in the foregoing embodiments.

An embodiment of this application further provides a computer program. When the computer program runs on a computer, any method in the foregoing embodiments is enabled to be performed.

An embodiment of this application further provides a communication system, including the first communication apparatus and the second communication apparatus in the foregoing embodiments.

An embodiment of this application further provides a chip, including a processor and an interface. The processor is coupled to a memory by using the interface. When the processor executes computer-executable instructions in the memory, any method provided in the foregoing embodiments is enabled to be performed.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer-executable instructions. When the computer-executable instructions are loaded and executed on a computer, the procedure or functions according to embodiments of this application are all or partially generated. The computer may be a general-purpose computer, a dedicated computer, a computer network, or other programmable apparatuses. The computer-executable instructions may be stored in a computer-readable storage medium or may be transmitted from a computer-readable storage medium to another computer-readable storage medium. For example, the computer-executable instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a DVD), a semiconductor medium (for example, a solid-state drive (solid-state drive, SSD)), or the like. It should be noted that the computer-executable instruction in this application may also be referred to as a computer program, an instruction, a computer instruction, or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" (comprising) does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Although this application is described with reference to specific features and embodiments thereof, it is clear that various modifications and combinations may be made to them without departing from the spirit and scope of this application. Correspondingly, the specification and accompanying drawings are merely example description of this application defined by the accompanying claims, and are considered as any of or all modifications, variations, combinations or equivalents that cover the scope of this application. It is clear that a person skilled in the art can make various modifications and variations to this application without departing from the spirit and scope of this application. This application is intended to cover these modifications and variations of this application provided that they fall within the scope of protection defined by the following claims of this application and their equivalent technologies.

What is claimed is:

1. A method, comprising:

generating, by a first communication apparatus, first indication information, wherein the first indication information indicates M orbital angular momentum (OAM) modes jointly supported by the first communication apparatus and a second communication apparatus, wherein there is a correspondence between N OAM modes in the M OAM modes and a demodulation reference signal (DMRS) port, wherein the DMRS port is an antenna port corresponding to a DMRS and a time-frequency resource corresponding to the DMRS port comprises a first part for transmitting the DMRS and a second part for transmitting information other than the DMRS, M and N are each an integer greater than 0, and M is greater than or equal to N; and sending, by the first communication apparatus, the first indication information to the second communication apparatus.

2. The method according to claim 1, wherein the first indication information indicates M mode values, and the M mode values are in a one-to-one correspondence with the M OAM modes.

3. The method according to claim 2, wherein the first indication information satisfies one of the following:

the first indication information is the M mode values;

the first indication information is a bitmap, each bit in the bitmap corresponds to a mode value in a preset mode value set, and a value of each bit in the bitmap indicates whether the mode value corresponding to the bit belongs to the M mode values;

the first indication information is at least one absolute mode value, a mode value corresponding to the at least one absolute mode value is the M mode values, and a non-zero absolute mode value corresponds to two mode values that are a positive mode value and a negative mode value;

the first indication information is a bitmap, each bit in the bitmap corresponds to an absolute mode value in a preset absolute mode value set, a value of each bit in the bitmap indicates whether a mode value corresponding to the absolute mode value corresponding to the bit belongs to the M mode values, and a non-zero absolute mode value corresponds to two OAM modes that are a positive mode value and a negative mode value;

the first indication information comprises an initial mode value, a mode value interval W1, and a quantity M of mode values, the M mode values are M mode values determined by using W1 as a mode value interval starting from the initial mode value, and W1 is greater than 0;

the first indication information comprises an initial absolute mode value, an absolute mode value interval W2, and a quantity S1 of absolute mode values, the S1 absolute mode values are S1 absolute mode values determined by using W2 as an absolute mode value interval starting from the initial absolute mode value, the M mode values are mode values corresponding to the S1 absolute mode values, a non-zero absolute mode value corresponds to two mode values that are a positive mode value and a negative mode value, W2 is greater than 0, and S1 is an integer greater than 0; or the first indication information is a first index, the first index is an index in a first table, the first table comprises a correspondence between at least one index and at least one mode value set, and mode values in a mode value set corresponding to the first index are the M mode values.

4. The method according to claim 3, wherein the method further comprises:

sending, by the first communication apparatus, second indication information to the second communication apparatus, wherein the second indication information indicates one or more of the following information: diffusion angles of OAM beams corresponding to the M OAM modes, crosstalk coefficients of the M OAM modes, or signal-to-noise ratios of the M OAM modes.

5. The method according to claim 1, wherein the M OAM modes satisfy one of the following:

the M OAM modes are OAM modes supported on a first time-frequency resource, the first time-frequency resource is used to transmit a first DMRS, the first time-frequency resource corresponds to one DMRS port or a plurality of DMRS ports, and time-frequency resources for sending the DMRS in time-frequency resources corresponding to the plurality of DMRS ports are comprised in the first time-frequency resource;

the M OAM modes are OAM modes supported in a first time unit;

the M OAM modes are OAM modes supported in a first time-frequency unit; or the M OAM modes are OAM modes jointly supported by the first communication apparatus and the second communication apparatus.

6. The method according to claim 1, wherein the method further comprises:

modulating, by the first communication apparatus by using an OAM mode that corresponds to the DMRS port obtained after OAM mapping, the DMRS and data on the DMRS port, to obtain a modulated DMRS and modulated data, wherein the OAM mapping refers to establishing the correspondence between the N OAM modes and the DMRS port; and sending, by the first communication apparatus, the modulated DMRS and the modulated data to the second communication apparatus.

7. An apparatus, comprising at least one processor, and at least one memory coupled to the at least one processor, wherein the at least one memory stores programming instructions for execution by the at least one processor to cause the apparatus to perform operations comprising:

generating first indication information, wherein the first indication information indicates M orbital angular momentum (OAM) modes jointly supported by the apparatus and a second communication apparatus, wherein there is a correspondence between N OAM modes in the M OAM modes and a demodulation reference signal (DMRS) port, wherein the DMRS port is an antenna port corresponding to a DMRS and a time-frequency resource corresponding to the DMRS port comprises a first part for transmitting the DMRS and a second part for transmitting information other than the DMRS, M and N are each an integer greater than 0, and M is greater than or equal to N; and sending the first indication information to the second communication apparatus.

8. The apparatus according to claim 7, wherein the first indication information indicates M mode values, and the M mode values are in a one-to-one correspondence with the M OAM modes.

9. The apparatus according to claim 8, wherein the first indication information satisfies one of the following:

the first indication information is the M mode values;

the first indication information is a bitmap, each bit in the bitmap corresponds to a mode value in a preset mode value set, and a value of each bit in the bitmap indicates whether the mode value corresponding to the bit belongs to the M mode values;

the first indication information is at least one absolute mode value, a mode value corresponding to the at least one absolute mode value is the M mode values, and a non-zero absolute mode value corresponds to two mode values that are a positive mode value and a negative mode value;

the first indication information is a bitmap, each bit in the bitmap corresponds to an absolute mode value in a preset absolute mode value set, a value of each bit in the bitmap indicates whether a mode value corresponding to the absolute mode value corresponding to the bit belongs to the M mode values, and a non-zero absolute mode value corresponds to two OAM modes that are a positive mode value and a negative mode value;

the first indication information comprises an initial mode value, a mode value interval W1, and a quantity M of mode values, the M mode values are M mode values determined by using W1 as a mode value interval starting from the initial mode value, and W1 is greater than 0;

the first indication information comprises an initial absolute mode value, an absolute mode value interval W2, and a quantity S1 of absolute mode values, the S1 absolute mode values are S1 absolute mode values determined by using W2 as an absolute mode value interval starting from the initial absolute mode value, the M mode values are mode values corresponding to the S1 absolute mode values, a non-zero absolute mode value corresponds to two mode values that are a positive mode value and a negative mode value, W2 is greater than 0, and S1 is an integer greater than 0; or the first indication information is a first index, the first index is an index in a first table, the first table comprises a correspondence between at least one index and at least one mode value set, and mode values in a mode value set corresponding to the first index are the M mode values.

10. The apparatus according to claim 7, wherein the operations further comprise:

sending second indication information to the second communication apparatus, wherein the second indication information indicates one or more of the following information: diffusion angles of OAM beams corresponding to the M OAM modes, crosstalk coefficients of the M OAM modes, or signal-to-noise ratios of the M OAM modes.

11. The apparatus according to claim 7, wherein the M OAM modes satisfy one of the following:

the M OAM modes are OAM modes supported on a first time-frequency resource, the first time-frequency resource is used to transmit a first DMRS, the first time-frequency resource corresponds to one DMRS port or a plurality of DMRS ports, and time-frequency resources for sending the DMRS in time-frequency resources corresponding to the plurality of DMRS ports are comprised in the first time-frequency resource;

the M OAM modes are OAM modes supported in a first time unit;

the M OAM modes are OAM modes supported in a first time-frequency unit; or the M OAM modes are OAM modes jointly supported by the apparatus and the second communication apparatus.

12. The apparatus according to claim 7, wherein the operations further comprise:

modulating, by using an OAM mode that corresponds to the DMRS port obtained after OAM mapping, the DMRS and data on the DMRS port, to obtain a modulated DMRS and modulated data, wherein the OAM mapping refers to establishing the correspondence between the N OAM modes and the DMRS port; and sending the modulated DMRS and the modulated data to the second communication apparatus.

13. An apparatus, comprising at least one processor, and at least one memory, wherein the at least one memory stores programming instructions for execution by the at least one processor to cause the apparatus to perform operations comprising:

receiving first indication information from a first communication apparatus, wherein the first indication information indicates M orbital angular momentum (OAM) modes jointly supported by the first communication apparatus and the apparatus, wherein there is a correspondence between N OAM modes in the M OAM modes and a demodulation reference signal (DMRS) port, wherein the DMRS port is an antenna port corresponding to a DMRS and a time-frequency resource corresponding to the DMRS port comprises a first part for transmitting the DMRS and a second part for transmitting information other than the DMRS, M and N are each an integer greater than 0, and M is greater than or equal to N.

14. The apparatus according to claim 13, wherein the first indication information indicates M mode values, and the M mode values are in a one-to-one correspondence with the M OAM modes.

15. The apparatus according to claim 14, wherein the first indication information satisfies one of the following:

the first indication information is the M mode values;

the first indication information is a bitmap, each bit in the bitmap corresponds to a mode value in a preset mode value set, and a value of each bit in the bitmap indicates whether the mode value corresponding to the bit belongs to the M mode values;

the first indication information is at least one absolute mode value, a mode value corresponding to the at least one absolute mode value is the M mode values, and a non-zero absolute mode value corresponds to two mode values that are a positive mode value and a negative mode value;

the first indication information is a bitmap, each bit in the bitmap corresponds to an absolute mode value in a preset absolute mode value set, a value of each bit in the bitmap indicates whether a mode value corresponding to the absolute mode value corresponding to the bit belongs to the M mode values, and a non-zero absolute mode value corresponds to two OAM modes that are a positive mode value and a negative mode value;

the first indication information comprises an initial mode value, a mode value interval W1, and a quantity M of mode values, the M mode values are M mode values determined by using W1 as a mode value interval starting from the initial mode value, and W1 is greater than 0;

the first indication information comprises an initial absolute mode value, an absolute mode value interval W2, and a quantity S1 of absolute mode values, the S1 absolute mode values are S1 absolute mode values determined by using W2 as an absolute mode value interval starting from the initial absolute mode value, the M mode values are mode values corresponding to the S1 absolute mode values, a non-zero absolute mode value corresponds to two mode values that are a positive mode value and a negative mode value, W2 is greater than 0, and S1 is an integer greater than 0; or the first indication information is a first index, the first index is an index in a first table, the first table comprises a correspondence between at least one index and at least one mode value set, and mode values in a mode value set corresponding to the first index are the M mode values.

16. The apparatus according to claim 13, wherein the operations further comprise:

receiving second indication information from the first communication apparatus, wherein the second indication information indicates one or more of the following information: diffusion angles of OAM beams corresponding to the M OAM modes, crosstalk coefficients of the M OAM modes, or signal-to-noise ratios of the M OAM modes.

17. The apparatus according to claim 13, wherein the M OAM modes satisfy one of the following:

the M OAM modes are OAM modes supported on a first time-frequency resource, the first time-frequency resource is used to transmit a first DMRS, the first time-frequency resource corresponds to one DMRS port or a plurality of DMRS ports, and time-frequency resources for sending the DMRS in time-frequency resources corresponding to the plurality of DMRS ports are comprised in the first time-frequency resource;

the M OAM modes are OAM modes supported in a first time unit;

the M OAM modes are OAM modes supported in a first time-frequency unit; or the M OAM modes are OAM modes jointly supported by the first communication apparatus and the apparatus.

18. The apparatus according to claim 13, wherein the operations further comprise:

receiving third indication information from the first communication apparatus, wherein the third indication information indicates whether to use an OAM mode to modulate the DMRS and data on the DMRS port.

19. The method according to claim 6, further comprising:

sending, by the first communication apparatus, third indication information to the second communication apparatus, wherein the third indication information indicates whether to use the OAM mode to modulate the DMRS and the data on the DMRS port.

20. The apparatus according to claim 12, wherein the operations further comprise:

sending third indication information to the second communication apparatus, wherein the third indication information indicates whether to use the OAM mode to modulate the DMRS and the data on the DMRS port.

* * * * *